US012198637B2

(12) United States Patent
Kim et al.

(10) Patent No.: US 12,198,637 B2
(45) Date of Patent: Jan. 14, 2025

(54) DISPLAY DEVICE, METHOD OF DRIVING THE SAME, AND ELECTRONIC DEVICE INCLUDING THE SAME

(71) Applicant: SAMSUNG DISPLAY CO., LTD., Yongin-si (KR)

(72) Inventors: Ga Ram Kim, Yongin-si (KR); Hun Bae Kim, Yongin-si (KR)

(73) Assignee: SAMSUNG DISPLAY CO., LTD, Yongin-si (KR)

( * ) Notice: Subject to any disclaimer, the term of this patent is extended or adjusted under 35 U.S.C. 154(b) by 0 days.

(21) Appl. No.: 18/505,307

(22) Filed: Nov. 9, 2023

(65) Prior Publication Data

US 2024/0161704 A1 May 16, 2024

(30) Foreign Application Priority Data

Nov. 10, 2022 (KR) ........................ 10-2022-0149868

(51) Int. Cl.
*G09G 3/3266* (2016.01)
*G09G 3/3225* (2016.01)

(52) U.S. Cl.
CPC ......... *G09G 3/3266* (2013.01); *G09G 3/3225* (2013.01); *G09G 2310/08* (2013.01)

(58) Field of Classification Search
CPC .. G09G 3/3266; G09G 3/3225; G09G 3/3233; G09G 3/3208; G09G 3/32; G09G 2300/0819; G09G 2300/0842; G09G 2300/0861; G09G 2310/08; G09G 2310/0251; G09G 2310/0262; G09G 2320/0247; G09G 2320/045; G09G 2320/02; G09G 2320/0233; G09G 2330/021; G09G 2340/0435; G09G 2360/144
See application file for complete search history.

(56) References Cited

U.S. PATENT DOCUMENTS 9,823,729 B2 * 11/2017 An ........................ G09G 3/3233
9,966,007 B2 * 5/2018 Cho ........................ G06F 1/1652
11,056,049 B2 7/2021 Kim et al.
(Continued)

FOREIGN PATENT DOCUMENTS

KR 10-2021-0013509 2/2021
KR 10-2021-0035370 4/2021
(Continued)

*Primary Examiner* — David Tung
(74) *Attorney, Agent, or Firm* — F. Chau & Associates, LLC

(57) ABSTRACT

A display device includes a timing controller configured to generate a first control signal using a first clock signal when driven at a first frame frequency, and generate a second control signal using a second clock signal when driven at a second frame frequency different from the first frame frequency, pixels connected to scan lines, data lines, and emission control lines, and an emission driver configured to supply an emission control signal to the emission control lines in response to an emission start signal included in the first control signal or the second control signal. The number of off periods of the emission control signal included in one frame driven at the first frame frequency is equal to the number of off periods of the emission control signal included in one frame driven at the second frame frequency.

31 Claims, 14 Drawing Sheets

(56) References Cited

U.S. PATENT DOCUMENTS

| | | | | |
|---|---|---|---|---|
| 11,151,949 | B2 | 10/2021 | Hwang et al. | |
| 11,295,673 | B2 | 4/2022 | Park et al. | |
| 11,341,934 | B2 | 5/2022 | Lee et al. | |
| 2015/0364076 | A1* | 12/2015 | Park | G09G 3/3233 345/77 |
| 2020/0193915 | A1* | 6/2020 | Noh | G09G 3/3233 |
| 2021/0049965 | A1* | 2/2021 | Jeon | G09G 3/3266 |
| 2021/0201738 | A1* | 7/2021 | Song | G09G 5/10 |
| 2022/0036814 | A1 | 2/2022 | Hwang | |
| 2022/0328008 | A1 | 10/2022 | Song et al. | |

FOREIGN PATENT DOCUMENTS

| | | |
|---|---|---|
| KR | 10-2021-0106052 | 8/2021 |
| KR | 10-2021-0158458 | 12/2021 |
| KR | 10-2022-0016346 | 2/2022 |

* cited by examiner

DISPLAY DEVICE, METHOD OF DRIVING THE SAME, AND ELECTRONIC DEVICE INCLUDING THE SAME

CROSS-REFERENCE TO RELATED APPLICATIONS

This application claims priority under 35 U.S.C. § 119 to Korean Patent Application No. 10-2022-0149868, filed on Nov. 10, 2022, the disclosure of which is incorporated by reference herein in its entirety.

TECHNICAL FIELD

Embodiments of the disclosure relate to a display device and a method of driving the same.

DISCUSSION OF RELATED ART

As advances are made in information technology, the use of a display device, such as a liquid crystal display device and an organic light emitting display device, which provides an interface between a user and information, has increased.

A display device may have a high-speed driving function that provides an image switched at a high frame frequency to a user, and a low-speed driving function that provides an image switched at a low frame frequency to the user to reduce power consumption.

SUMMARY

An object of the disclosure is to provide a display device and a method of driving the same capable of minimizing or reducing power consumption when changing a frame frequency.

Another object of the disclosure is to provide a display device and a method of driving the same capable of minimizing or reducing a luminance difference when changing a frame frequency.

According to embodiments of the disclosure, a display device includes a timing controller configured to generate a first control signal using a first clock signal when driven at a first frame frequency, and generate a second control signal using a second clock signal when driven at a second frame frequency different from the first frame frequency, a plurality of pixels connected to at least one of a plurality of scan lines, a data line among a plurality of data lines, and an emission control line among a plurality of emission control lines, and an emission driver configured to supply an emission control signal to the emission control lines in response to an emission start signal included in the first control signal or the second control signal. A number of off periods of the emission control signal included in one frame driven at the first frame frequency is equal to a number of off periods of the emission control signal included in one frame driven at the second frame frequency.

According to an embodiment, the second frame frequency is higher than the first frame frequency.

According to an embodiment, a frequency of the second clock signal is higher than a frequency of the first clock signal.

According to an embodiment, the display device further includes a scan driver configured to supply a scan signal to the scan lines in response to the first control signal or the second control signal, and a data driver configured to supply a data signal to the data lines in response to the first control signal or the second control signal.

According to an embodiment, the timing controller generates the second control signal using the second clock signal when driven at a frequency exceeding the first frame frequency, and generates the first control signal using the first clock signal when driven at a frequency equal to or less than the first frame frequency.

According to an embodiment, a width of a first active period included in the one frame driven at the first frame frequency is different from a width of a second active period included in the one frame driven at the second frame frequency.

According to an embodiment, the width of the first active period is wider than the width of the second active period.

According to an embodiment, a ratio occupied by an off period of the emission control signal in the one frame driven at the first frame frequency is equal to a ratio occupied by the off period of the emission control signal in the one frame driven at the second frame frequency.

According to an embodiment, the timing controller receives a mode control signal including a first mode corresponding to driving at a frequency equal to or less than the first frame frequency or a second mode corresponding to driving at a frequency equal to or less than the second frame frequency.

According to an embodiment, the timing controller includes an oscillator configured to output the first clock signal or the second clock signal, a mode controller configured to receive the mode control signal, an oscillator controller configured to control the oscillator in response to a driving frequency signal, and the first mode or the second mode included in the mode control signal, and a start signal controller configured to output the emission start signal.

According to an embodiment, the oscillator generates the first clock signal under control of the oscillator controller when driven in the first mode.

According to an embodiment, when the oscillator controller is driven in the second mode, the oscillator generates the first clock signal under control of the oscillator controller when driving frequency information included in the driving frequency signal is equal to or less than the first frame frequency, and the oscillator generates the second clock signal under the control of the oscillator controller when the driving frequency information included in the driving frequency signal exceeds the first frame frequency and is equal to or less than the second frame frequency.

According to an embodiment, the start signal controller controls the emission start signal such that the number of off periods of the emission control signal included in the one frame driven at the second frame frequency is changed when a photo sensing signal corresponding to illuminance sensing is supplied.

According to an embodiment, the start signal controller changes the emission start signal such that a less number of emission off periods are included in the one frame driven at the second frame frequency when the photo sensing signal is supplied.

According to an embodiment of the disclosure, a display device driven in a first mode in which a highest frequency is a first frame frequency and in a second mode in which a highest frequency is a second frame frequency higher than the first frame frequency includes a timing controller configured to generate a first control signal using a first clock signal such that one frame includes a first active period when driven at the first frame frequency in the second mode, and generate a second control signal using a second clock signal such that one frame includes a second active period different from the first active period when changed from the first frame frequency to the second frame frequency, a plurality of pixels connected to at least one of a plurality of scan lines, a data line among a plurality of data lines, and an emission control line among a plurality of emission control lines, a scan driver configured to supply a scan signal to the scan lines in response to the first control signal or the second control signal, and an emission driver configured to supply an emission control signal to the emission control lines in response to the first control signal or the second control signal.

According to an embodiment, the second frame frequency is higher than the first frame frequency.

According to an embodiment, a frequency of the second clock signal is higher than a frequency of the first clock signal.

According to an embodiment, the emission control signal includes at least two or more off periods such that the pixels do not emit light during one frame period, and a number of off periods included in one frame period when driven at the first frame frequency is equal to a number of off periods included in one frame period when driven at the second frame frequency.

According to an embodiment of the disclosure, a method of driving a display device driven in a first mode in which a first frame frequency is set to a highest frequency and a second mode in which a second frame frequency is set to a highest frequency includes generating a second control signal using a second clock signal when a mode control signal corresponding to the second mode is input, driving the display device at the second frame frequency using the second control signal, changing a driving frequency of the display device to the first frame frequency while driven in the second mode, generating a first control signal using a first clock signal different from the second clock signal, and driving the display device at the first frame frequency using the first control signal.

According to an embodiment, the second frame frequency is higher than the first frame frequency.

According to an embodiment, a frequency of the second clock signal is higher than a frequency of the first clock signal.

According to an embodiment, the method may further include generating the first control signal using the first clock signal when the mode control signal corresponding to the first mode is input, and driving the display device at the first frame frequency using the first control signal.

According to an embodiment, a number of times pixels do not emit light during one frame period when driven at the first frame frequency is equal to a number of times that the pixels do not emit light during one frame period when driven at the second frame frequency.

According to an embodiment, a width of a first active period included in one frame when driven at the first frame frequency is different from a width of a second active period included in one frame when driven at the second frame frequency.

According to an embodiment, the width of the first active period is wider than the width of the second active period.

According to an embodiment of the disclosure, an electronic device includes a controller configured to generate a first control signal using a first clock signal regardless of a frame frequency change when driven in a first mode in which a highest frequency is a first frame frequency, and generate the first control signal or a second control signal using the first clock signal or a second clock signal in response to the frame frequency change when driven in a second mode in which a highest frequency is a second frame frequency higher than the first frame frequency, a display panel controlled by the first control signal or the second control signal and configured to display an image, and an emission driver configured to control an emission time of pixels included in the display panel by supplying an emission control signal in response to an emission start signal supplied from the controller.

According to an embodiment, the controller generates the first control signal using the first clock signal when driven at a frequency equal to or less than the first frame frequency in the second mode, and generates the second control signal using the second clock signal when driven at a frequency exceeding the first frame frequency.

According to an embodiment, a number of off periods of the emission control signal included in one frame period when driven at the first frame frequency is equal to a number of off periods included in one frame period when driven at the second frame frequency.

According to an embodiment, the electronic device may further include a photo sensor configured to sense external illuminance.

According to an embodiment, the photo sensor supplies a photo sensing signal to the controller when sensing the external illuminance, and the controller changes a number of off periods of the emission control signal included in one frame of the second frame frequency when the photo sensing signal is supplied.

According to an embodiment, the controller controls the emission start signal such that a less number of emission off periods are included in one frame of the second frame frequency when the photo sensing signal is supplied.

Objects of the disclosure are not limited to the objects described above, and other technical objects which are not described will be clearly understood by those skilled in the art from the following description.

In accordance with the display device and the method of driving the same according to embodiments of the disclosure, the first control signal is generated using the first clock signal when driven at the first frame frequency, and the second control signal having a frequency higher than that of the first clock signal when driven at the second frame frequency higher than the first frame frequency.

That is, in an embodiment of the disclosure, a display device is driven using the second control signal when driven at the second frame frequency which is a high frequency, and the display device is driven using the first control signal when driven at a frequency equal to or less than the first frame frequency, which is a low frequency. Here, since the first control signal is generated using the first clock signal when driven at the frequency equal to or less than the first frame frequency, power consumption may be minimized or reduced.

In addition, in an embodiment of the disclosure, the number of off periods of the emission control signal included in one frame of the first frame frequency and the number of off periods of the emission control signal included in one frame of the second frame frequency are set to be the same. Then, when a frequency is changed from the second frame frequency to the first frame frequency, a luminance difference may be minimized or reduced.

However, an effect of the disclosure is not limited to the above-described effects, and may be variously expanded without departing from the spirit and scope of the disclosure.

BRIEF DESCRIPTION OF THE DRAWINGS

The above and other features of the disclosure will become more apparent by describing in detail embodiments thereof with reference to the accompanying drawings, in which.

DETAILED DESCRIPTION OF THE EMBODIMENTS

Figure 1:
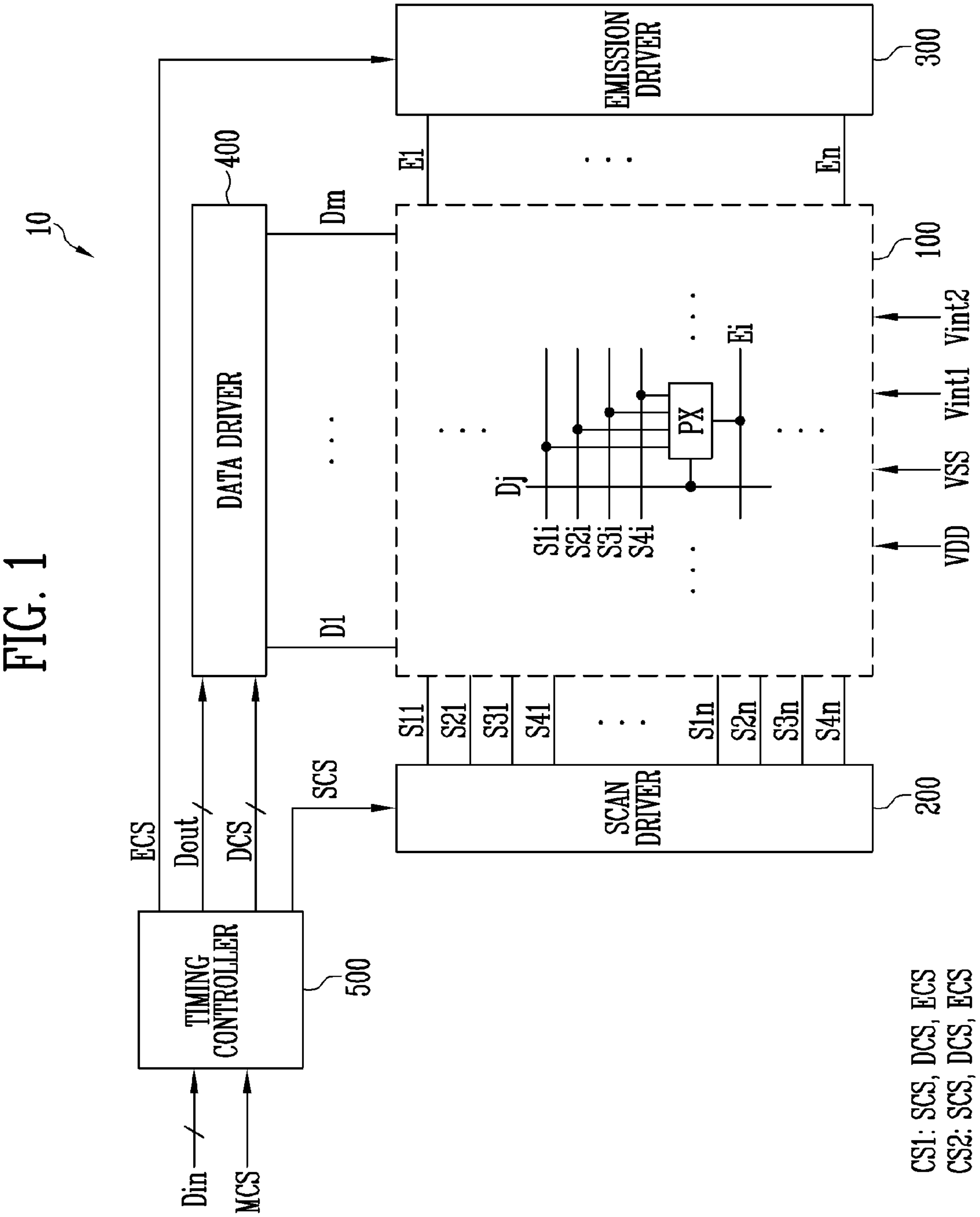
FIG. 1 is a diagram illustrating a display device according to an embodiment of the disclosure.

Embodiments of the disclosure will be described more fully hereinafter with reference to the accompanying drawings. Like reference numerals may refer to like elements throughout the accompanying drawings.

For convenience of explanation, parts that are not related to the description may be omitted in the following description.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

It will be understood that the terms "first," "second," "third," etc. are used herein to distinguish one element from another, and the elements are not limited by these terms. Thus, a "first" element in an embodiment may be described as a "second" element in another embodiment.

It should be understood that descriptions of features or aspects within each embodiment should typically be considered as available for other similar features or aspects in other embodiments, unless the context clearly indicates otherwise.

As used herein, the singular forms "a", "an" and "the" are intended to include the plural forms as well, unless the context clearly indicates otherwise.

FIG. 1 is a diagram illustrating a display device according to an embodiment of the disclosure.

Referring to FIG. 1, the display device 10 may include a pixel unit 100, a scan driver 200, an emission driver 300, a data driver 400, and a timing controller 500.

The display device 10 may display an image at various frame frequencies (e.g., driving frequency, refresh rate, or screen reproduction rate) according to a driving condition. The frame frequency is a frequency at which a data voltage is substantially written to a driving transistor of a pixel PX for one second. For example, the frame frequency is also referred to as a screen scan rate or a screen reproduction frequency, and indicates a frequency at which a display screen is reproduced for one second.

In an embodiment, an output frequency of the data driver and/or a first scan signal supplied to a first scan line S11 to supply a data signal may be changed in response to the frame frequency. For example, a frame frequency for moving image driving may be a frequency of about 60 Hz or higher (for example, about 60 Hz, about 120 Hz, or about 240 Hz). When the frame frequency is 60 Hz, the first scan signal may be supplied 60 times per second to each horizontal line (or pixel row).

In an embodiment, the display device 10 may adjust an output frequency of the scan driver 200 and the emission driver 300, and an output frequency of the data driver 400 corresponding to the output frequency of the scan driver 200 and the emission driver 300 according to the driving condition. For example, the display device 10 may display an image in response to various frame frequencies of about 1 Hz to about 120 Hz. However, this is an example, and the display device 10 may display an image at a frame frequency of about 120 Hz or higher (for example, about 240 Hz or about 480 Hz).

The pixel unit 100 may include scan lines S11 to S1*n*, S21 to S2*n*, S31 to S3*n*, and S41 to S4*n*, emission control lines E1 to En, and data lines D1 to Dm, and pixels PX connected to the scan lines S11 to S1*n*, S21 to S2*n*, S31 to S3*n*, and S41 to S4*n*, the emission control lines E1 to En, and the data lines D1 to Dm (here, m and n are integers greater than 1). For example, each of the pixels PX may be connected to one of the scan lines S11 to S1*n*, one of the scan lines S21 to S2*n*, one of the scan lines S31 to S3*n*, one of the scan lines S41 to S4*n*, one of the emission control lines E1 to En, and one of the data lines D1 to Dm. Each of the pixels PX may include a driving transistor and a plurality of switching transistors.

The timing controller 500 may receive input data Din, a mode control signal MCS, and control signals from a host system such as an application processor (AP), through a predetermined interface. The timing controller 500 may control a driving timing of the scan driver 200, the emission driver 300, and the data driver 400.

The timing controller 500 may generate a first control signal CS1 or a second control signal CS2 using a first clock signal CLK1 (refer to FIG. 5) or a second clock signal CLK2 (refer to FIG. 5) in response to the mode control signal MCS. In an embodiment, the mode control signal MCS may include a first mode signal corresponding to normal driving and a second mode signal corresponding to high-speed driving.

The first mode may correspond to the normal driving and may mean a case of driving at a driving frequency equal to or less than a first frame frequency. The second mode may correspond to the high-speed driving and may mean a case of driving at a driving frequency equal to or less than a second frame frequency higher than the first frame frequency.

When driven in the first mode, power consumption may be reduced, and when driven in the second mode, image quality may be increased. A user may select the first mode or the second mode, and the first mode or the second mode may be supplied to the timing controller 500 as the mode control signal MCS.

When a driving mode is selected as the first mode, the timing controller 500 may generate the first control signal CS1 using the first clock signal CLK1. When the driving mode is selected as the second mode, the timing controller 500 may generate the second control signal CS2 using the second clock signal CLK2. Since the second frame frequency is set to a frequency higher than the first frame frequency, the second clock signal CLK2 may be set to a frequency higher than that of the first clock signal CLK1.

In an embodiment, the timing controller 500 may generate the first control signal CS1 in response to the first mode when driven at the frequency equal to or less than the first frame frequency even though the mode control signal MCS corresponding to the second mode is input.

For example, the timing controller 500 may generate the second control signal CS2 using the second clock signal CLK2 and drive the display device 10 in response to the second control signal CS2, when the mode control signal MCS corresponding to the second mode is input and the driving frequency exceeds the first frame frequency.

In addition, the timing controller 500 may generate the first control signal CS1 using the first clock signal CLK1 and drive the display device 10 in response to the first control signal CS1, when the mode control signal MCS corresponding to the second mode is input and the driving frequency is equal to or less than the first frame frequency. In other words, even though the mode control signal MCS corresponding to the second mode is input, the display device 10 may be driven in the first mode when the driving frequency is equal to or less than the first frame frequency. In this case, moving image quality may be increased and power consumption may be reduced. A detailed description in relation to this is described below.

The timing controller 500 may generate a scan control signal SCS, a data control signal DCS, and an emission unit control signal ECS using the first clock signal CLK1 or the second clock signal CLK2. In addition, the timing controller 500 may divide the first clock signal CLK1 or the second clock signal CLK2 to generate a horizontal synchronization signal Hsync and a vertical synchronization signal Vsync.

The scan control signal SCS may be supplied to the scan driver 200, the emission unit control signal ECS may be supplied to the emission driver 300, and the data control signal DCS may be supplied to the data driver 400. In addition, the timing controller 500 may correct (or rearrange) the input data Din to generate output data Dout and supply the output data Dout to the data driver 400.

The scan driver 200 may receive the scan control signal SCS from the timing controller 500 and supply a first scan signal, a second scan signal, a third scan signal, and a fourth scan signal to first scan lines S11 to S1*n*, second scan lines S21 to S2*n*, third scan lines S31 to S3*n*, and fourth scan lines S41 to S4*n*, respectively, based on the scan control signal SCS.

The first to fourth scan signals may be set to a gate-on voltage corresponding to a type of a transistor to which corresponding scan signals are supplied. A transistor receiving a scan signal may be set to a turn-on state when the scan signal is supplied. For example, a gate-on voltage of a scan signal supplied to a P-channel metal oxide semiconductor (PMOS) transistor may be a logic low level, and a gate-on voltage of a scan signal supplied to an N-channel metal oxide semiconductor (NMOS) transistor may be a logic high level. Hereinafter, a meaning of "supplied with the scan signal" may be understood as that the scan signal is supplied with a logic level that turns on a transistor controlled thereby.

The emission driver 300 may receive the emission unit control signal ECS from the timing controller 500 and supply an emission control signal to the emission control lines E1 to En based on the emission unit control signal ECS. For example, the emission driver 300 may generate the emission control signal using an emission start signal included in the emission unit control signal ECS (included in the first control signal CS1 or the second control signal CS2). The emission driver 300 may sequentially supply the emission control signal to the emission control lines E1 to En.

The emission control signal may be set to a gate-off voltage (for example, a high voltage). A transistor receiving the emission control signal may be turned off when the emission control signal is supplied, and may be turned on in other cases. Hereinafter, a meaning of "the emission control signal is supplied" may be understood as that the emission control signal is supplied at a logic level that turns off a transistor controlled thereby.

In FIG. 1, for convenience of description, each of the scan driver 200 and the emission driver 300 is shown as a single configuration, but the disclosure is not limited thereto. For example, according to an embodiment, the scan driver 200 may include a plurality of scan drivers each supplying at least one of the first to fourth scan signals. In addition, at least a portion of the scan driver 200 and the emission driver 300 may be integrated into one driving circuit, module, or the like, according to embodiments.

The data driver 400 may receive the data control signal DCS and the output data Dout from the timing controller 500. The data driver 400 may convert the digital output data Dout into an analog data signal (or data voltage) in response to the data control signal DCS. The data driver 400 may supply a data signal to the data lines D1 to Dm. For example, the data driver 400 may supply the data signal to the data lines D1 to Dm in synchronization with the first scan signal supplied to the first scan lines S11 to S1*n*.

In an embodiment, the display device 10 may further include a power supply. The power supply may supply a voltage of first driving power VDD, a voltage of second driving power VSS, a voltage of first initialization power Vint1, and a voltage of second initialization power Vint2 that drives the pixel PX to the pixel unit 100.

Figure 2:
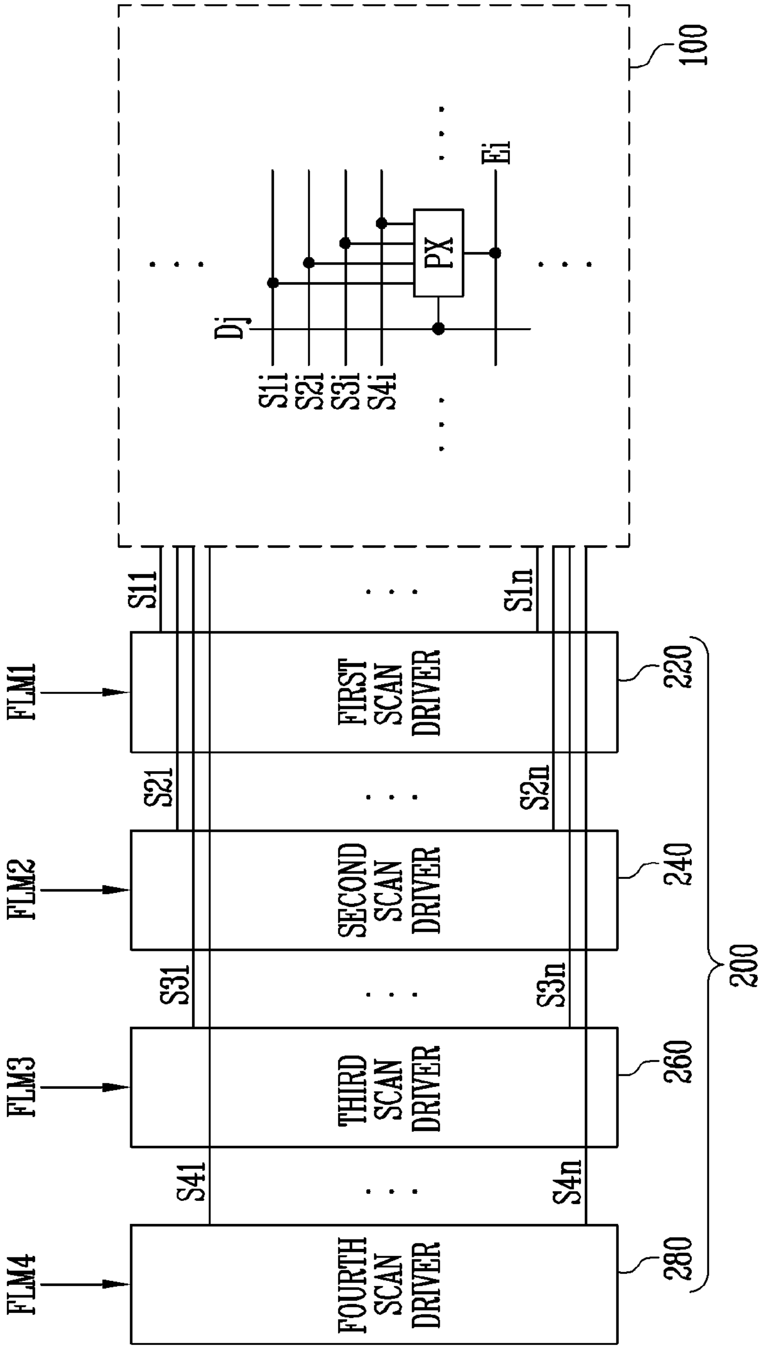
FIG. 2 is a diagram illustrating an embodiment of a scan driver included in the display device of FIG. 1.

FIG. 2 is a diagram illustrating an embodiment of the scan driver included in the display device of FIG. 1.

Referring to FIG. 2, the scan driver 200 may include a first scan driver 220, a second scan driver 240, a third scan driver 260, and a fourth scan driver 280.

The scan control signal SCS may include first to fourth scan start signals FLM1 to FLM4. The first to fourth scan start signals FLM1 to FLM4 may be supplied to the first to fourth scan drivers 220 to 280, respectively. A width, a supply timing, and the like of the first to fourth scan start signals FLM1 to FLM4 may be determined according to a driving condition and a frame frequency of the pixel PX.

The first scan driver 220 may sequentially supply the first scan signal to the first scan lines S11 to S In in response to the first scan start signal FLM1. The second scan driver 240 may sequentially supply the second scan signal to the second scan lines S21 to S2*n* in response to the second scan start signal FLM2. The third scan driver 260 may sequentially supply the third scan signal to the third scan lines S31 to S3*n* in response to the third scan start signal FLM3. The fourth scan driver 280 may sequentially supply the fourth scan signal to the fourth scan lines S41 to S4*n* in response to the fourth scan start signal FLM4.

Figure 3:
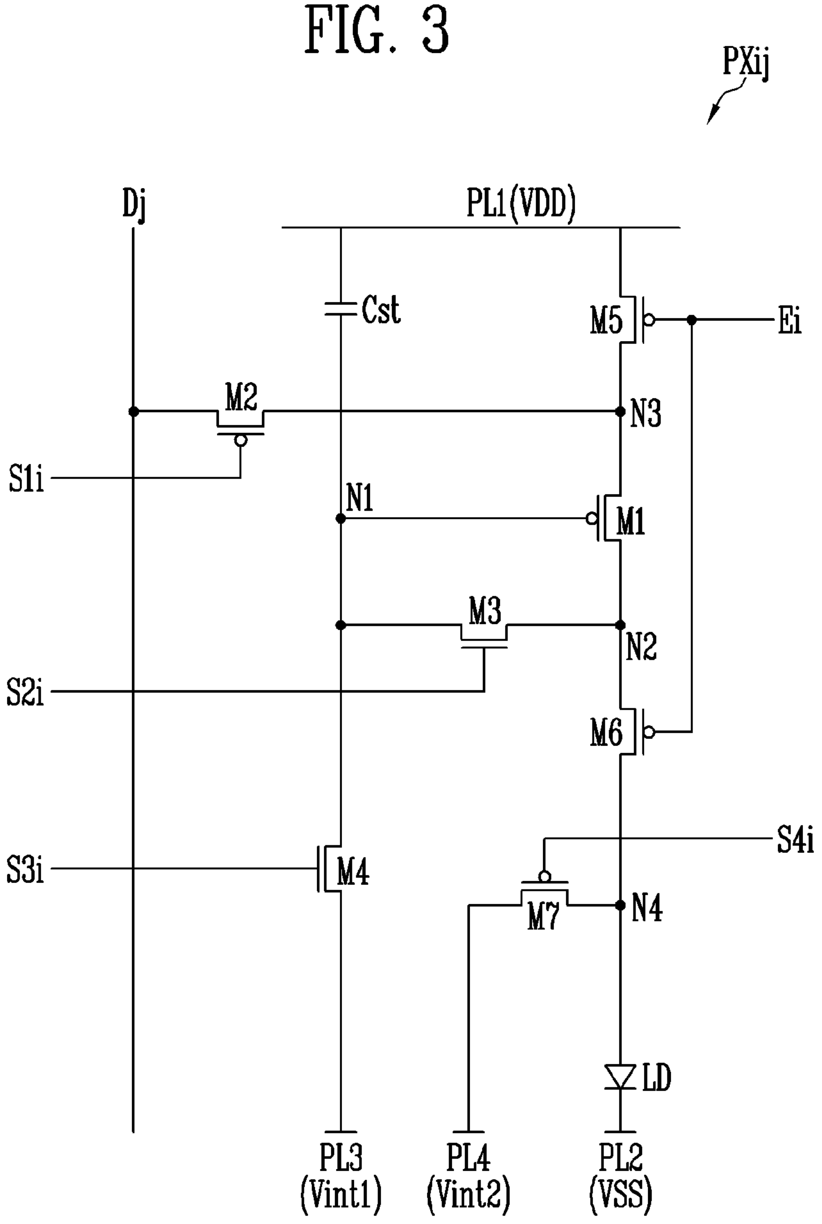
FIG. 3 is a diagram illustrating an embodiment of a pixel included in the display device of FIG. 1.

FIG. 3 is a diagram illustrating an embodiment of the pixel included in the display device of FIG. 1. In FIG. 3, for convenience of description, a pixel PXij positioned on an i-th horizontal line (or an i-th pixel row) and connected to a j-th data line Dj is shown (here, i and j are positive integers).

Referring to FIG. 3, a pixel Pxij according to an embodiment of the disclosure includes a light emitting element LD and a pixel circuit that controls a current amount supplied to the light emitting element LD.

A first electrode (or an anode electrode) of the light emitting element LD may be connected to a fourth node N4, and a second electrode (or a cathode electrode) of the light emitting element LD may be connected to a second power line PL2 supplied with the second driving power VSS. The light emitting element LD may generate light of a predetermined luminance in response to a current amount supplied from a first transistor M1.

In an embodiment, the light emitting element LD may be, for example, an organic light emitting diode. In an embodiment, the light emitting element LD may be, for example, an inorganic light emitting diode such as a micro light emitting diode (LED) or a quantum dot light emitting diode. The light emitting element LD may be an element in which an organic material and an inorganic material are combined. In FIG. 3, the pixel PX includes a single light emitting element LD. However, the disclosure is not limited thereto. For example, but in an embodiment, the pixel PX may include a plurality of light emitting elements, and the plurality of light emitting elements may be connected in series, in parallel, or in series-parallel with each other.

The pixel circuit may include first to seventh transistors M1 to M7 and a storage capacitor Cst.

A first electrode of the first transistor M1 (or a driving transistor) may be connected to a third node N3, and a second electrode may be connected to a second node N2. In addition, a gate electrode of the first transistor M1 may be connected to a first node N1. The first transistor M1 may control a current amount supplied from the first driving power VDD to the second driving power VSS via the light emitting element LD in response to a voltage of the first node N1. To this end, the first driving power VDD may be set to a voltage higher than that of the second driving power VSS.

The second transistor M2 may be connected between the data line Dj and the third node N3. In addition, a gate electrode of the second transistor M2 may be connected to a first scan line S1*i*. The second transistor M2 may be turned on when the first scan signal is supplied to the first scan line S1*i* to electrically connect the data line Dj and the third node N3.

The third transistor M3 may be connected between the first node N1 and the second node N2. In addition, a gate electrode of the third transistor M3 may be connected to a second scan line S2*i*. The third transistor M3 may be turned on when the second scan signal is supplied to the second scan line S2*i* to electrically connect the first node N1 and the second node N2. When the third transistor M3 is turned on, the first transistor M1 is connected in a diode form.

The fourth transistor M4 is connected between the first node N1 and a third power line PL3 to which the first initialization power Vint1 is supplied. In addition, a gate electrode of the fourth transistor M4 is connected to a third scan line S3*i*. The fourth transistor M4 may be turned on when the third scan signal is supplied to the third scan line S3*i* to supply the voltage of the first initialization power Vint1 to the first node N1. Here, the voltage of the first initialization power Vint1 may be set to a voltage lower than the data signal supplied to the data line Dj.

The fifth transistor M5 is connected between a first power line PL1 to which the first driving power VDD is supplied and the third node N3. In addition, a gate electrode of the fifth transistor M5 may be connected to the emission control line Ei. The fifth transistor M5 may be turned off when the emission control signal is supplied to the emission control line Ei, and may be turned on in other cases.

The sixth transistor M6 is connected between the second node N2 and the fourth node N4. In addition, a gate electrode of the sixth transistor M6 may be connected to the emission control line Ei. The sixth transistor M6 may be turned off when the emission control signal is supplied to the emission control line Ei, and may be turned on in other cases. In FIG. 3, the fifth transistor M5 and the sixth transistor M6 are connected to the same emission control line Ei. However, the disclosure is not limited thereto. For example, in an embodiment, the fifth transistor M5 and the sixth transistor M6 may be connected to different emission control lines.

The seventh transistor M7 is connected between the fourth node N4 and a fourth power line PL4 to which the second initialization power Vint2 is supplied. In addition, a gate electrode of the seventh transistor M7 may be connected to the fourth scan line S4*i*. The seventh transistor M7 may be turned on when the fourth scan signal is supplied to the fourth scan line S4*i* to supply the voltage of the second initialization power Vint2 to the fourth node N4.

When the voltage of the second initialization power Vint2 is supplied to the fourth node N4, a parasitic capacitor of the light emitting element LD may be discharged. As a residual voltage charged in the parasitic capacitor of the light emitting element LD is discharged (or removed), unintended fine light emission may be prevented or reduced. Therefore, black expression capability of the pixel Pxij may be increased.

In an embodiment, the first initialization power Vint1 and the second initialization power Vint2 may be set to voltages different from each other. That is, a voltage initializing the first node N1 and a voltage initializing the fourth node N4 may be set to be different from each other. However, this is an example, and the voltage of the first initialization power Vint1 and the voltage of the second initialization power Vint2 may be substantially the same.

The storage capacitor Cst is connected between the first power line PL1 and the first node N1. The storage capacitor Cst may store a voltage applied to the first node N1.

In an embodiment, the first transistor M1, the second transistor M2, the fifth transistor M5, the sixth transistor M6, and the seventh transistor M7 may be formed of a polysilicon semiconductor transistor. For example, the first transistor M1, the second transistor M2, the fifth transistor M5, the sixth transistor M6, and the seventh transistor M7 may include a polysilicon semiconductor layer formed through a low temperature poly-silicon (LTPS) process as an active layer (channel). In addition, the first transistor M1, the second transistor M2, the fifth transistor M5, the sixth transistor M6, and the seventh transistor M7 may be a P-type transistor (for example, a PMOS transistor). Accordingly, a gate-on voltage that turns on the first transistor M1, the second transistor M2, the fifth transistor M5, the sixth transistor M6, and the seventh transistor M7 may be a logic low level.

Since the polysilicon semiconductor transistor has a fast response speed, the polysilicon semiconductor transistor may be applied to a switching element that utilizes fast switching.

In an embodiment, the third transistor M3 and the fourth transistor M4 may be formed of an oxide semiconductor transistor. For example, the third transistor M3 and the fourth transistor M4 may be an N-type oxide semiconductor transistor (for example, an NMOS transistor), and may include an oxide semiconductor layer as an active layer. Accordingly, a gate-on voltage that turns on the third transistor M3 and the fourth transistor M4 may be a logic high level.

The oxide semiconductor transistor may be processed at a low temperature and has a charge mobility lower than that of a polysilicon semiconductor transistor. That is, the oxide semiconductor transistor has an excellent off-current characteristic. Therefore, when the third transistor M3 and the fourth transistor M4 are formed of an oxide semiconductor transistor, a leakage current from the first node N1 according to low-frequency driving may be minimized or reduced, and thus, display quality may be increased.

Figure 4A:
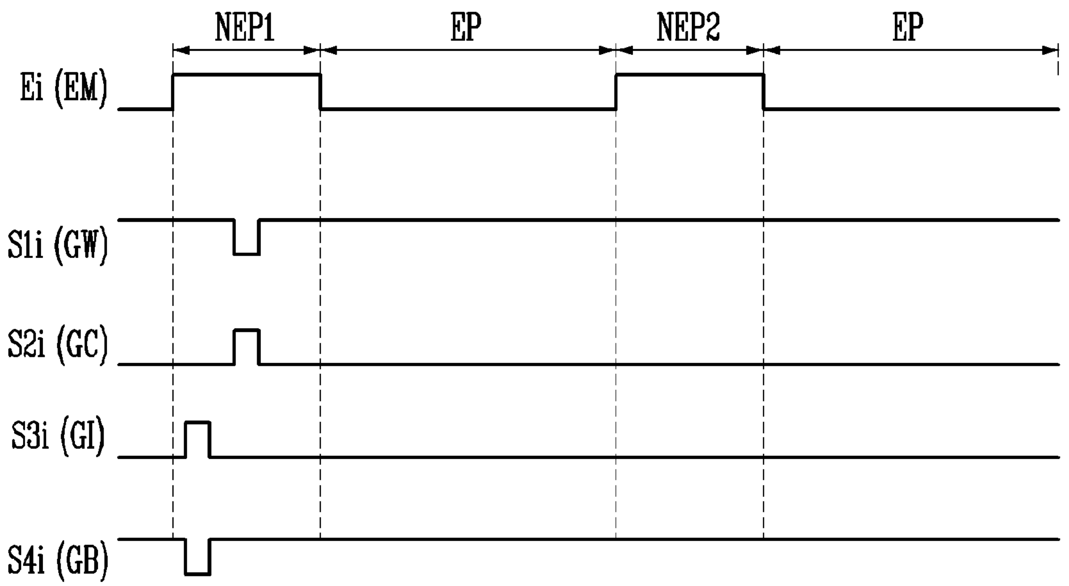
FIGS. 4A and 4B are diagrams illustrating signals supplied to the pixel in one frame period of FIG. 3 according to an embodiment of the disclosure.
Figure 4B:
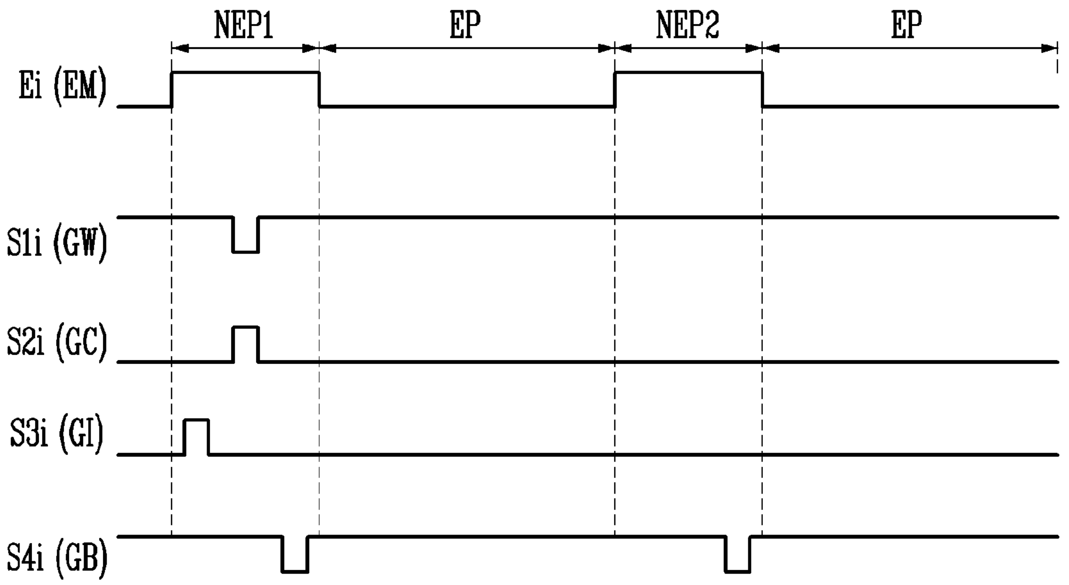

FIGS. 4A and 4B are diagrams illustrating signals supplied to the pixel in one frame period of FIG. 3 according to an embodiment of the disclosure.

Referring to FIG. 4A, one frame period may include an emission period EP, a first non-emission period NEP1, and a second non-emission period NEP2. The emission period EP may be adjacent to each of the first non-emission period NEP1 and the second non-emission period NEP2.

In FIG. 4A, the two non-emission periods NEP1 and NEP2 are included in one frame period. However, the disclosure is not limited thereto. For example, the number of non-emission periods NEP1 and NEP2 included in one frame period may be set variously according to the frame frequency and/or setting of the display device 10.

The first non-emission period NEP1 may refer to a period in which the data signal is written. The second non-emission period NEP2 may refer to a period in which a previous data signal is maintained and the pixel Pxij does not emit light. When a plurality of non-emission periods are included in one frame period, unintended effects such as motion blur and the like may be reduced, and thus, moving image quality may be increased.

The emission control signal EM may be supplied a plurality of times during one frame period. That is, the emission control signal EM may have an off period corresponding to the first non-emission period NEP1 and the second non-emission period NEP2. Here, the off period of the emission control signal may refer to a period in which the emission control signal is supplied, and thus, the fifth transistor M5 and the sixth transistor M6 are turned off. The off period may be divided into a first off period corresponding to the first non-emission period NEP1 and a second off period corresponding to the second non-emission period NEP2.

Describing an operation process, first, the fifth transistor M5 and the sixth transistor M6 are turned off by the emission control signal EM supplied to the emission control line Ei during the first non-emission period NEP1. When the fifth transistor M5 and the sixth transistor M6 are turned off, electrical connection between the first power line PL1 and the light emitting element LD is blocked, and thus, the light emitting element LD is set to a non-emission state.

Thereafter, a third scan signal GI is supplied to the third scan line S3*i*, and a fourth scan signal GB is supplied to the fourth scan line S4*i*. When the third scan signal GI is supplied to the third scan line S3*i*, the fourth transistor M4 is turned on, and when the fourth scan signal GB is supplied to the fourth scan line S4*i*, the seventh transistor M7 is turned on.

When the fourth transistor M4 is turned on, the voltage of the first initialization power Vint1 is supplied to the first node N1, and thus, the first node N1 is initialized to the voltage of the first initialization power Vint1. When the seventh transistor M7 is turned on, the voltage of the second initialization power Vint2 is supplied to the fourth node N4, and thus, the anode electrode of the light emitting element LD is initialized to the voltage of the second initialization power Vint2. Here, the fourth scan signal GB supplied to the fourth scan line S4*i* may be set as a first scan signal supplied to a first scan line S1*i*-1 positioned on a previous horizontal line.

Thereafter, a first scan signal GW is supplied to the first scan line S1*i* and a second scan signal GC is supplied to the second scan line S2*i*. When the first scan signal GW is supplied to the first scan line S1*i*, the second transistor M2 is turned on. When the second scan signal GC is supplied to the second scan line S2*i*, the third transistor M3 is turned on.

When the second transistor M2 is turned on, the data line Dj and the third node N3 are electrically connected, and thus, the data signal is supplied from the data line Dj to the third node N3. When the third transistor M3 is turned on, the first transistor M1 is connected in a diode form. In this case, the data signal supplied to the third node N3 is supplied to the first node N1 via the first transistor M1 connected in the diode form. Therefore, a voltage corresponding to the data signal and a threshold voltage of the first transistor M1 may be applied to the first node N1. The storage capacitor Cst stores the voltage applied to the first node N1.

After the data signal and the voltage corresponding to the threshold voltage of the first transistor M1 are stored in the storage capacitor Cst, the supply of the emission control signal EM is stopped. When the supply of the emission control signal EM is stopped, the fifth transistor M5 and the sixth transistor M6 are turned on. When the fifth transistor M5 and the sixth transistor M6 are turned on, the first power line PL1 may be electrically connected to the anode electrode of the light emitting element LD via the fifth transistor M5, the first transistor M1, and the sixth transistor M6. At this time, the first transistor M1 supplies a driving current corresponding to the voltage applied to the first node N1 to the light emitting element LD, and the light emitting element LD emits light with a luminance corresponding to the driving current. That is, the light emitting element LD may emit light with the luminance corresponding to the driving current during the emission period EP after the first non-emission period NEP1.

In the second non-emission period NEP2, the emission control signal EM is supplied to the emission control line Ei, and thus, the fifth transistor M5 and the sixth transistor M6 are turned off. When the fifth transistor M5 and the sixth transistor M6 are turned off, an electrical connection between the first power line PL1 and the light emitting element LD is blocked, and thus, the light emitting element LD is set to the non-emission state.

In the second non-emission period NEP2, the scan signals GW, GC, GI, and GB are not supplied. Therefore, the storage capacitor Cst maintains the voltage stored in the first non-emission period NEP1. During the emission period EP following the second non-emission period NEP2, the supply of the emission control signal EM is stopped, and thus, the fifth transistor M5 and the sixth transistor M6 are turned on. Then, during the emission period EP following the second non-emission period NEP2, the light emitting element LD may emit light with a luminance corresponding to the driving current.

In an embodiment, a supply waveform of the scan signal that drives the pixel Pxij may be variously changed. For example, as shown in FIG. 4B, after the first scan signal GW is supplied to the first scan line S1*i* during the first non-emission period NEP1, the fourth scan signal GB may be supplied to the fourth scan line S4*i*. In addition, the fourth scan signal GB may be supplied to the fourth scan line S4*i* during the second non-emission period NEP2.

When the fourth scan signal GB is supplied to the fourth scan line S4*i* during the second non-emission period NEP2, the seventh transistor M7 is turned on, and thus, the anode electrode of the light emitting element LD may be initialized to the voltage of the initialization power Vint2. When the voltage of the second initialization power Vint2 is supplied to the anode electrode of the light emitting element LD during the second non-emitting period NEP2, a luminance increase of the light emitting element LD may be prevented or reduced.

Figure 5:
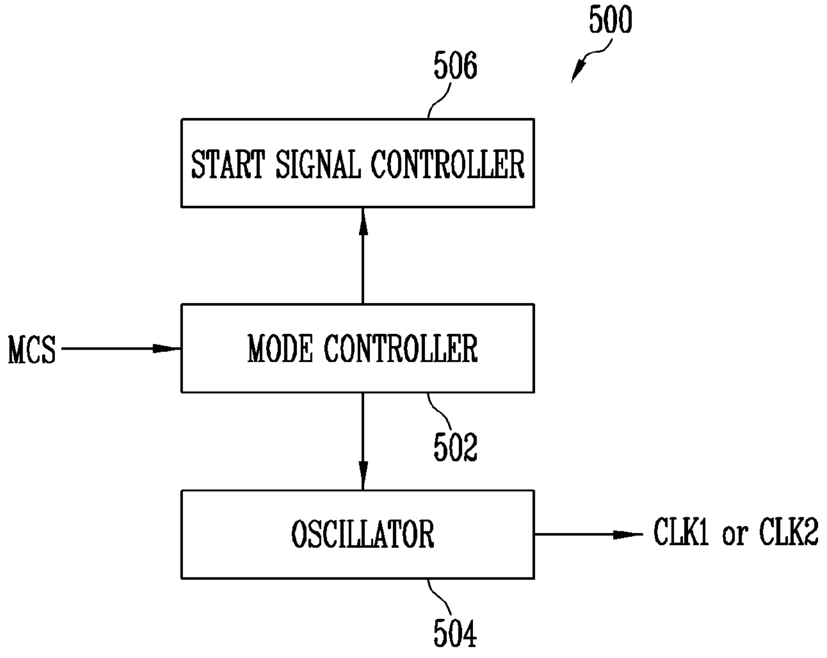
FIG. 5 is a diagram illustrating a configuration of a timing controller according to a comparative example.
Figure 6:
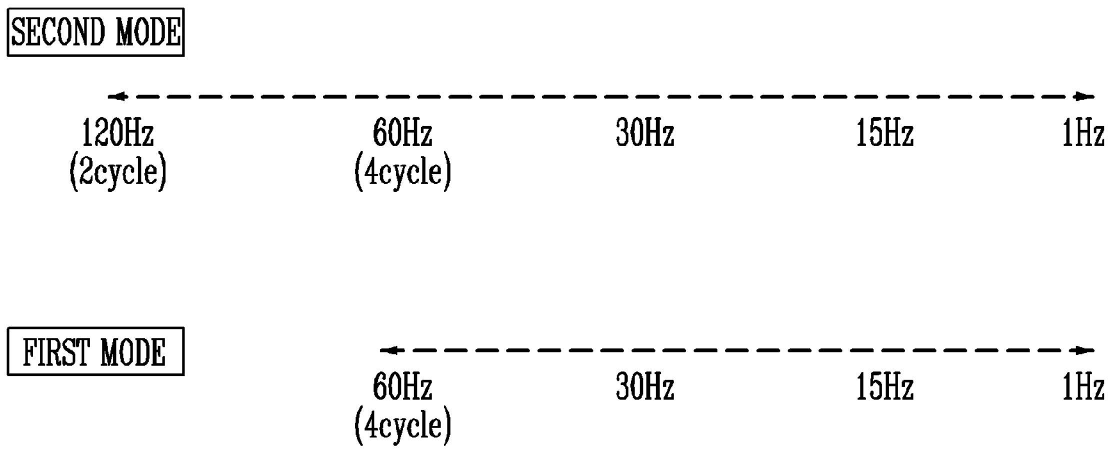
FIG. 6 is a diagram illustrating driving by the timing controller of FIG. 5.
Figure 7:
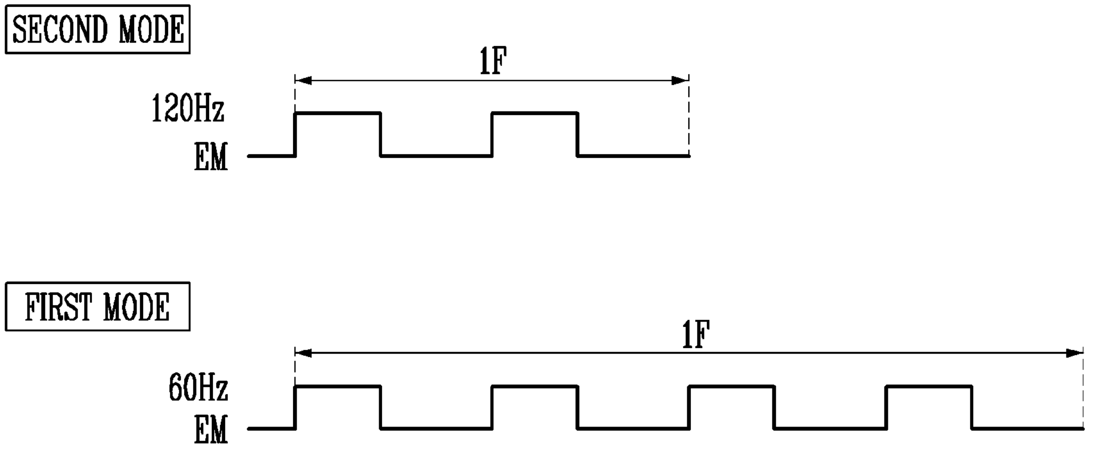
FIG. 7 is a diagram illustrating an emission control signal supplied during one frame period by the timing controller of FIG. 5.

FIG. 5 is a diagram illustrating a configuration of a timing controller according to a comparative example. FIG. 6 is a diagram illustrating driving by the timing controller of FIG. 5. FIG. 7 is a diagram illustrating an emission control signal supplied during one frame period by the timing controller of FIG. 5. In FIG. 5, only a configuration necessary for a description of the disclosure is briefly shown among various configurations of the timing controller.

Referring to FIG. 5, a timing controller 500 may include a mode controller 502, an oscillator 504, and a start signal controller 506.

The mode controller 502 receives the mode control signal MCS from outside of the timing controller 500. Information corresponding to the first mode or the second mode may be included in the mode control signal MCS. Here, the first mode may correspond to normal driving, and the second mode may correspond to high-speed driving.

In an embodiment, the first mode may be a mode that drives the display device while minimizing or reducing power consumption, and as shown in FIG. 6, the first mode may be driven at a frequency equal to or less than the first frame frequency (for example, about 60 Hz). The second mode may be a mode that increases image quality and may be driven at a frequency equal to or less than the second frame frequency (for example, about 120 Hz).

In FIG. 6, the first frame frequency is about 60 Hz and the second frame frequency is about 120 Hz. However, the disclosure is not limited thereto. The first frame frequency may be set to a frequency lower than the second frame frequency, and may be set to various frequencies in correspondence thereto. For example, the first frame frequency may be set to about 120 Hz, and the second frame frequency may be set to about 240 Hz.

The first mode or the second mode may be determined by a selection of a user. The mode selected by the user is supplied to the mode controller 502 as the mode control signal MCS. The mode controller 502 receiving the mode control signal MCS may control the oscillator 504 to generate the first clock signal CLK1 or the second clock signal CLK2.

When the mode control signal MCS corresponds to the first mode, the mode controller 502 may control the oscillator 504 to generate the first clock signal CLK1. A frequency of the first clock signal CLK1 may be set so that the display device 10 may be driven at the first frame frequency.

When the mode control signal MCS corresponds to the second mode, the mode controller 502 may control the oscillator 504 to generate the second clock signal CLK2. A frequency of the second clock signal CLK2 may be set so that the display device 10 may be driven at the second frame frequency. The second clock signal CLK2 may be set to a frequency higher than that of the first clock signal CLK1.

When the first clock signal CLK1 is generated from the oscillator 504 (that is, in the first mode), the timing controller 500 may divide the first clock signal CLK1 to generate the horizontal synchronization signal Hsync and the vertical synchronization signal Vsync. In addition, the timing controller 500 may generate the first control signal CS1 using the horizontal synchronization signal Hsync, the vertical synchronization signal Vsync, and the first clock signal CLK1.

When the second clock signal CLK2 is generated from the oscillator 504 (that is, in the second mode), the timing controller 500 may divide the second clock signal CLK2 to generate the horizontal synchronization signal Hsync and the vertical synchronization signal Vsync. In addition, the timing controller 500 may generate the second control signal CS2 using the horizontal synchronization signal Hsync, the vertical synchronization signal Vsync, and the second clock signal CLK2.

The start signal controller 506 may generate the emission start signal in response to control of the mode controller 502. The emission start signal may be included in the emission unit control signal ECS and supplied to the emission driver 300. The start signal controller 506 may generate the emission start signal so that the number of off periods of the emission control signal is adjusted to correspond to the frame frequency. For example, when the display device 10 is driven at the second frame frequency, the start signal controller 506 may generate the emission start signal so that two off periods of the emission control signal are included in one frame (for example, 2 cycle driving) as shown in FIG. 7. In addition, when the display device 10 is driven at the first frame frequency, the start signal controller 506 may generate the emission start signal so that four off periods of the emission control signal are included in one frame (for example, 4 cycle driving) as shown in FIG. 7.

When the display device 10 is driven in the first mode, the timing controller 500 may drive the display device 10 at the frequency equal to or less than the first frame frequency in response to the driving condition. For example, the timing controller 500 may drive the display device 10 at about 60 Hz, about 30 Hz, about 15 Hz, and about 1 Hz as shown in FIG. 6. However, this is an example, and the timing controller 500 may drive the display device at various frequencies equal to or less than the first frame frequency.

When the display device 10 is driven in the second mode, the timing controller 500 may drive the display device 10 at the frequency equal to or less than the second frame frequency in response to the driving condition. For example, the timing controller 500 may drive the display device 10 at about 120 Hz, about 60 Hz, about 30 Hz, about 15 Hz, and about 1 Hz as shown in FIG. 6. However, this is an example, and the timing controller 500 may drive the display device 10 at various frequencies equal to or less than the second frame frequency.

When the display device 10 is driven in the above-described method, the display device 10 is driven by the second control signal CS2 corresponding to the second clock signal CLK2 even though the display device 10 is driven at a low frame frequency (for example, the first frame frequency) in the second mode, and thus, power consumption may not be reduced to a level equal to or less than a certain level.

For example, in the second mode, the second control signal CS2 is generated using the second clock signal CLK2 having a high frequency, and thus, power consumption is higher than that of the first mode in which the first control signal CS1 is generated using the first clock signal CLK1.

For example, power consumption may be set to about 232 mW when driven at the first frame frequency in the first mode, and power consumption may be set to about 307 mW when driven at the first frame frequency in the second mode. That is, the second mode consumes higher power consumption compared to the first mode even though driven at the same frame frequency.

Figure 8:
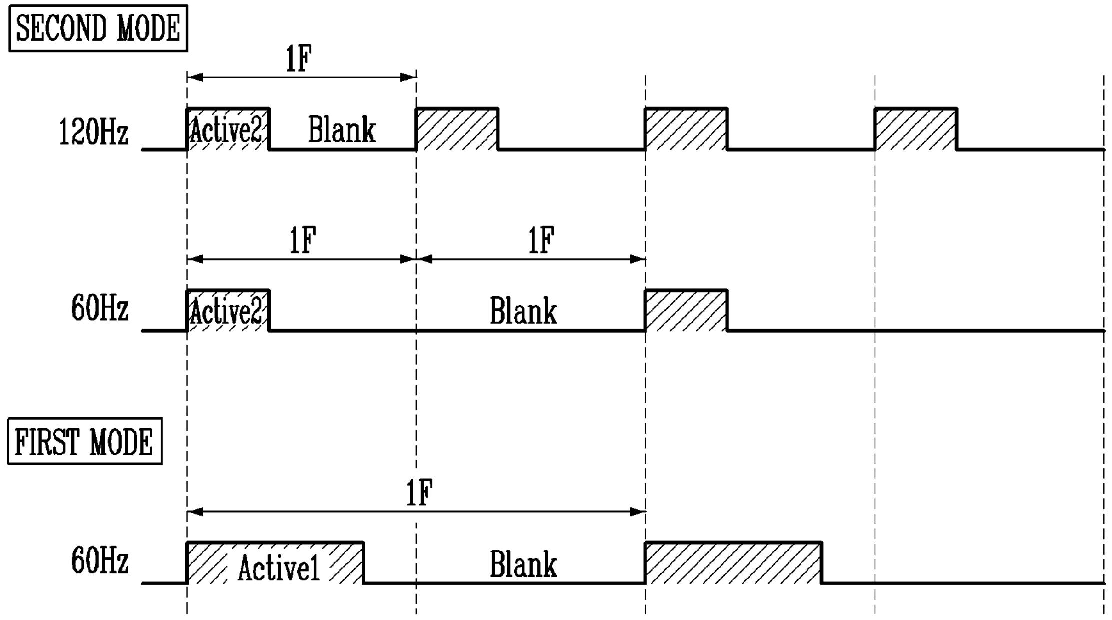
FIG. 8 is a diagram illustrating an active period of one frame in a first mode and a second mode.

FIG. 8 is a diagram illustrating an active period of one frame in the first mode and the second mode.

Referring to FIG. 8, when the display device 10 is driven in the second mode, an active period Active2 (or a second active period) included in one frame is determined based on the second frame frequency. For example, when driven in the second mode, the second clock signal CLK2 generated by the oscillator 504 may be divided to generate the horizontal synchronization signal Hsync corresponding to the second frame frequency, and the second active period Active2 may be determined by the horizontal synchronization signal Hsync.

The second active period Active2 may refer to a period in which the data signal is supplied during one frame period. In an embodiment, one horizontal period (1H) (for example, about 2.64 μs) may be determined in response to the second frame frequency, and the second active period Active2 may be set by one horizontal period (1H).

When the frame frequency is changed in the second mode, for example, when the frame frequency is changed from a frame frequency of about 120 Hz to a frame frequency of about 60 Hz, the second active period Active2 may be identically set, and a length of a blank period Blank may be set to be different. For example, when driven at about 60 Hz in the second mode, the second active period Active2 may be included in a frame period based on about 120 Hz, and only the blank period Blank may be included in one subsequent frame period. Therefore, one second active period Active2 may be included in two successive frames, and thus, driving may be performed at about 60 Hz. Additionally, in FIG. 8, one frame has a period equal to about 120 Hz in the second mode. However, the disclosure is not limited thereto. For example, it may be assumed that one frame includes both of a frame including the second active period Active2 and a frame including only the blank period Blank. As described above, in the second mode, the frame frequency may be changed while controlling the length of the blank period Blank.

When the display device 10 is driven in the first mode, an active period Active1 (or a first active period) included in one frame is determined based on the first frame frequency. For example, when driven in the first mode, the first clock signal CLK1 generated by the oscillator 504 may be divided to generate the horizontal synchronization signal Hsync corresponding to the first frame frequency, and the first active period Active1 may be determined by the horizontal synchronization signal Hsync.

The first active period Active1 may refer to a period in which the data signal is supplied during one frame period. In an embodiment, one horizontal period (1H) (for example, about 5.29 μs) may be determined in response to the first frame frequency, and the first active period Active1 may be set by one horizontal period (1H).

When the frame frequency is changed in the first mode, the first active period Active1 may be identically set, and the length of the blank period Blank may be set to be different. That is, the frame frequency may be changed while controlling the length of the blank period Blank.

Since the clock signals CLK1 and CLK2 are generated based on different driving frequencies, lengths of the active periods Active1 and Active2 may be differently set in each of the first mode and the second mode. As described above, when the lengths of the active periods Active1 and Active2 are differently set, a luminance difference between frames may occur when the mode is changed (for example, from the second mode to the first mode).

An embodiment of the disclosure provides a method of minimizing or reducing a luminance difference when changing from the second mode to the first mode (or from the first mode to the second mode). That is, in an embodiment of the disclosure, the display device may be driven in the second mode when the frame frequency is high, and it the display device 10 may be driven in the first mode when the frame frequency is low. In this case, image quality may be increased and power consumption may be minimized or reduced.

Figure 9A:
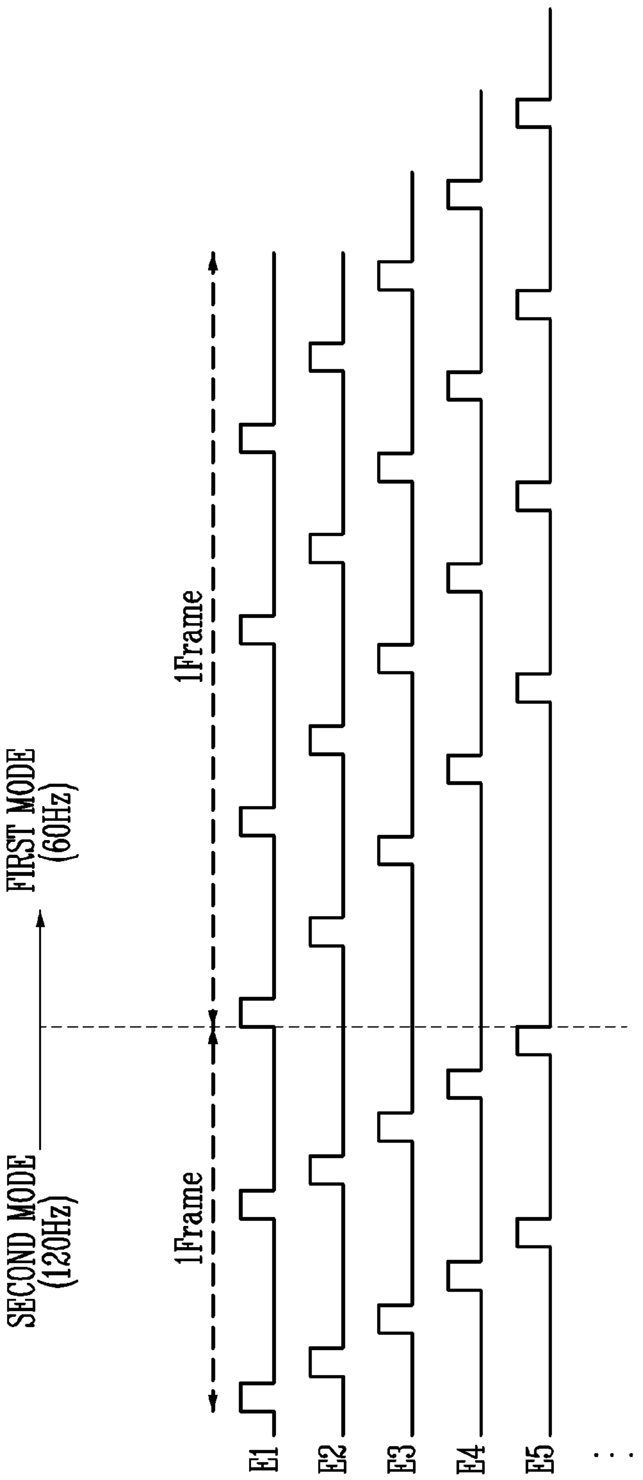
FIGS. 9A to 9C are diagrams illustrating a luminance difference when a frame frequency is changed from a second frame frequency of the second mode to a first frame frequency of the first mode using the timing controller of FIG. 5.
Figure 9B:
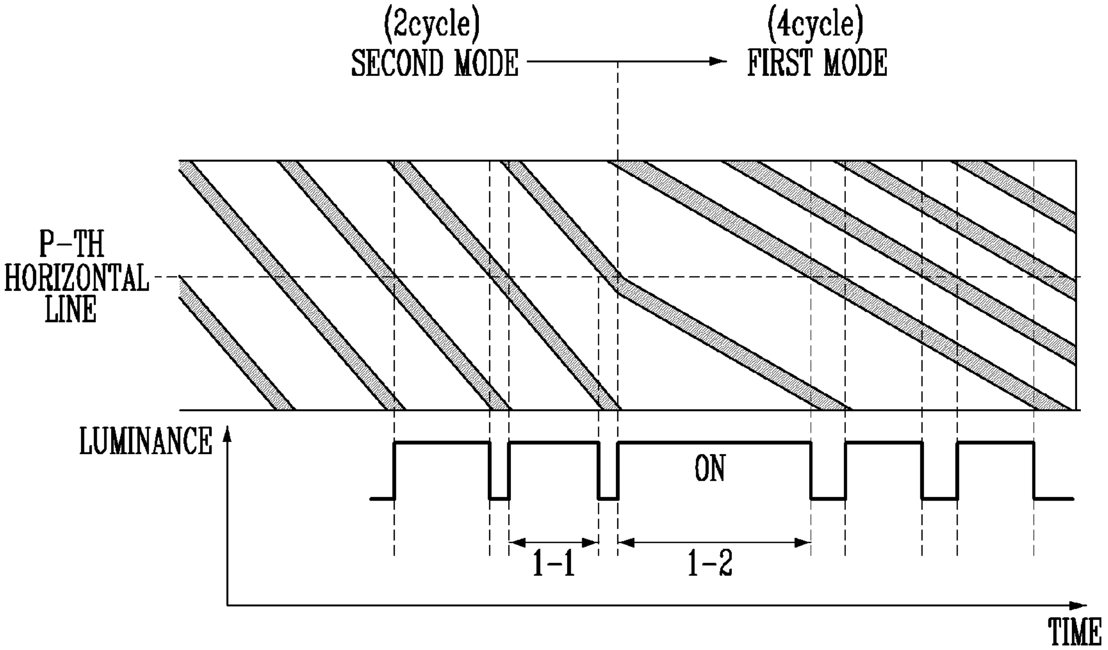
Figure 9C:
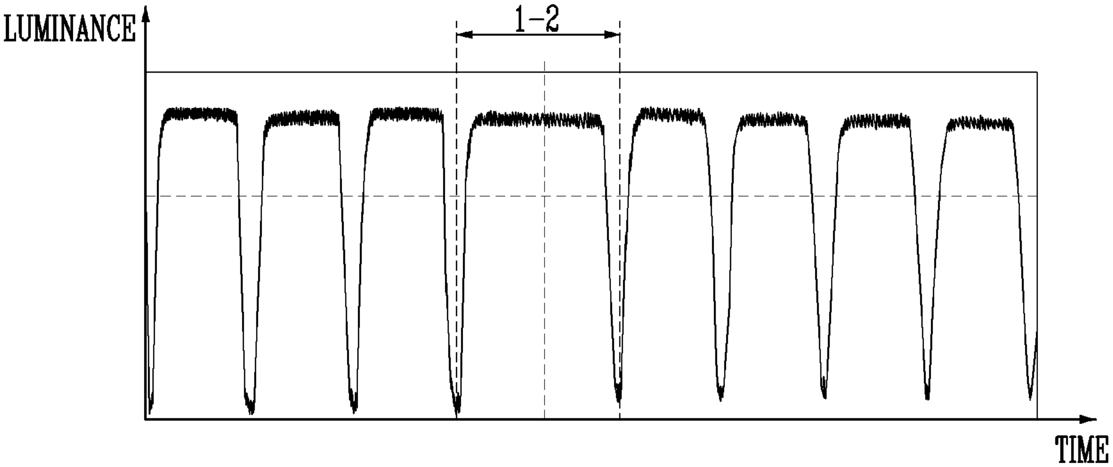

FIGS. 9A to 9C are diagrams illustrating a luminance difference when a frame frequency is changed from the second frame frequency of the second mode to the first frame frequency of the first mode using the timing controller of FIG. 5. In FIGS. 9A to 9C, it is assumed that the second frame frequency is about 120 Hz and the first frame frequency is about 60 Hz. In FIG. 9A, for convenience of description, emission control signals supplied to five emission control lines E1 to E5 are illustrated.

Referring to FIG. 9A, the emission control signal includes two off periods (that is, non-emission periods) at the second frame frequency of the second mode, and the emission control signal includes four off periods at the first frame frequency of the first mode. In this case, as shown in FIG. 9A, when the mode is changed from the second mode to the first mode, the emission period increases from a first horizontal line to a last horizontal line, and thus, a luminance difference occurs.

For example, as shown in FIG. 9B, when a pixel positioned on a p-th (here, p is a positive integer) horizontal line corresponding to an approximate middle area of the pixel unit 100 is changed from the second mode to the first mode, an emission time is increased in a (1-2)-th period compared to that of a previous period (for example, a (1-1)-th period). For example, the (1-2)-th period may be set to about 8 ms, and the (1-1)-th period may be set to about 3.5 ms. In this case, a luminance may be increased in the (1-2)-th period, and thus, the luminance difference may be perceived by the user when the mode is switched.

FIG. 9C is a graph illustrating a luminance when the mode is changed from the second mode to the first mode.

Referring to FIG. 9C, as described above, the emission time of the (1-2)-th period is increased compared to another period. An increase of the emission time means that the pixel maintains emission for a long time, and thus, the luminance of the pixel may be increased.

Figure 10:
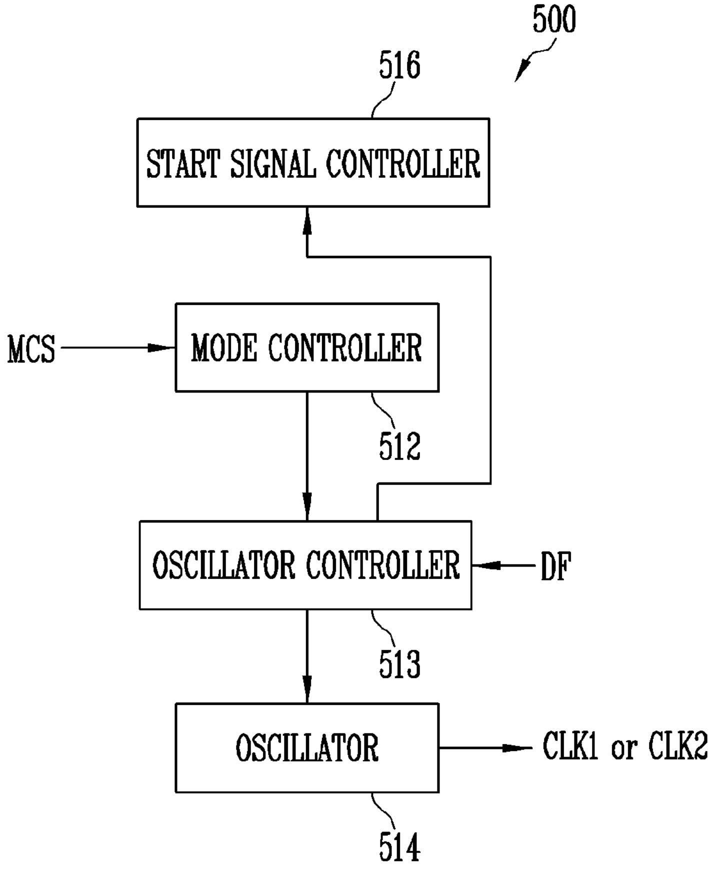
FIG. 10 is a diagram illustrating a timing controller according to an embodiment of the disclosure.
Figure 11:
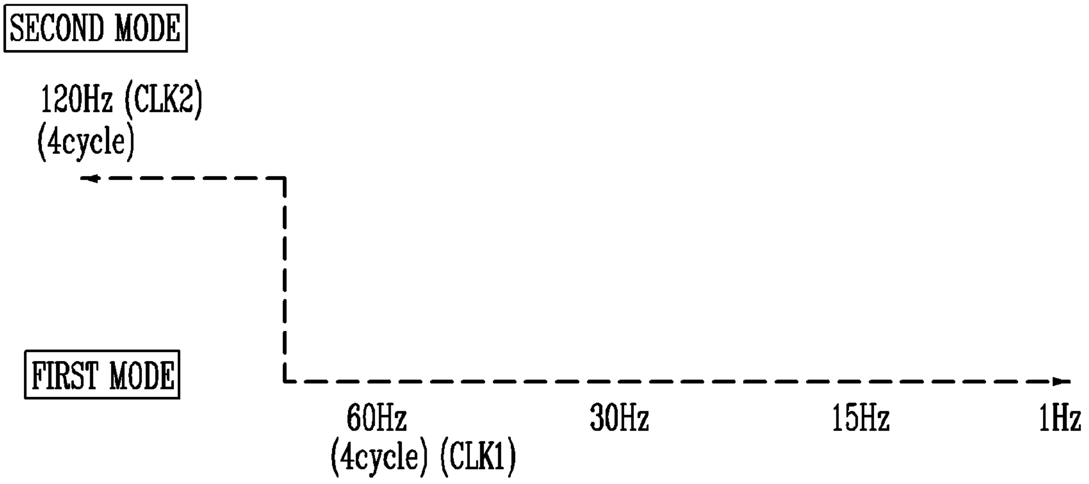
FIG. 11 is a diagram illustrating an embodiment of a driving method corresponding to the timing controller of FIG. 10.
Figure 12A:
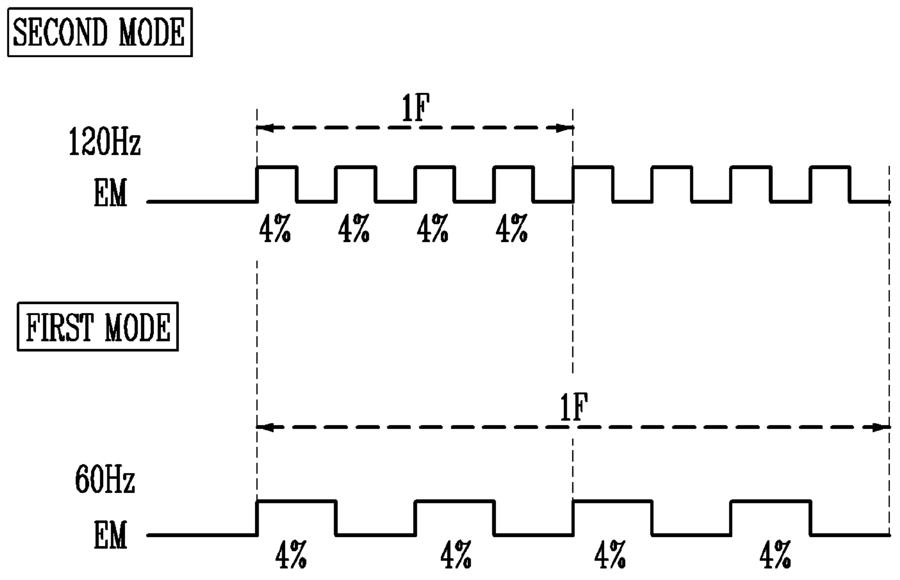
FIGS. 12A and 12B are diagrams illustrating an emission control signal supplied during one frame period by the timing controller of FIG. 10 according to an embodiment of the disclosure.
Figure 12B:
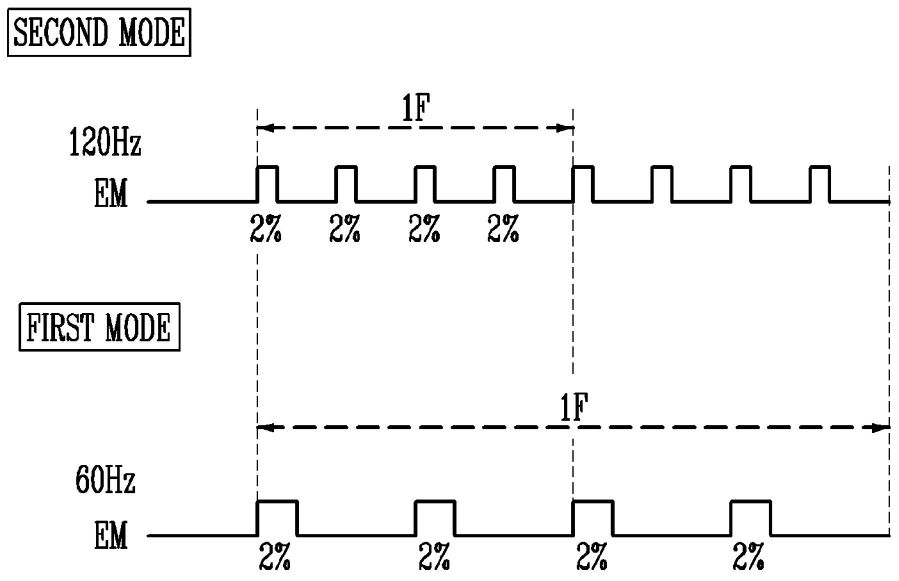
Figure 14:
FIG. 14 is a diagram illustrating an embodiment of a driving method corresponding to the timing controller of FIG. 10.

FIG. 10 is a diagram illustrating a timing controller according to an embodiment of the disclosure. FIG. 11 is a diagram illustrating an embodiment of a driving method corresponding to the timing controller of FIG. 10. FIGS. 12A and 12B are diagrams illustrating an emission control signal supplied during one frame period by the timing controller of FIG. 10 according to an embodiment of the disclosure. FIG. 14 is a diagram illustrating an embodiment of a driving method corresponding to the timing controller of FIG. 10.

Referring to FIG. 10, a timing controller 500 according to an embodiment of the disclosure may include a mode controller 512, an oscillator controller 513, an oscillator 514, and a start signal controller 516.

The mode controller 512 receives the mode control signal MCS from outside of the timing controller 500. The mode control signal MCS may include information corresponding to the first mode corresponding to the normal driving or the second mode corresponding to the high-speed driving.

The oscillator controller 513 may receive mode information from the mode controller 512 and receive a driving frequency signal DF from another configuration of the timing controller 500 (or from outside of the timing controller 500). Here, the driving frequency signal DF may include frame frequency information at which the display device 10 is currently driven.

For example, the timing controller 500 may change the frame frequency of the display device 10 in response to various driving conditions (for example, a still image and a moving image), and supply the frame frequency information to the oscillator controller 513 as the driving frequency signal DF. The oscillator controller 513 controls the oscillator 514 in response to the mode information from the mode controller 512 and the driving frequency signal DF.

The oscillator 514 generates the first clock signal CLK1 or the second clock signal CLK2 under the control of the oscillator controller 513. The first clock signal CLK1 or the second clock signal CLK2 may be used as an internal clock of the timing controller 500, and the timing controller 500 may divide the first clock signal CLK1 or the second clock signal CLK2 to generate the horizontal synchronization signal Hsync and the vertical synchronization signal Vsync. In addition, the timing controller 500 may generate the first control signal CS1 and the second control signal CS2 using the horizontal synchronization signal Hsync, the vertical synchronization signal Vsync, and the clock signal CLK1 or CLK2.

The oscillator 514 may generate the first clock signal CLK1 when the display device is driven at the frequency equal to or less than the first frame frequency regardless of the first mode and the second mode, and generate the second clock signal CLK2 when the display device 10 is driven at the frequency greater than the first frame frequency and equal to or less than the second frame frequency, under the control of the oscillator controller 513. Here, the first frame frequency may mean the highest frequency that may be driven in the first mode, and the second frame frequency may mean the highest frequency that may be driven in the second mode.

The frequency of the first clock signal CLK1 may be set so that the display device 10 may be driven at the first frame frequency, and the frequency of the second clock signal CLK2 may be set so that the display device 10 may be driven at the second frame frequency. In this case, the second clock signal CLK2 has a frequency higher than that of the first clock signal CLK1.

Referring to a case of driving in the first mode, the mode control signal MCS corresponding to the first mode is supplied to the mode controller 512. When the mode control signal MCS corresponding to the first mode is supplied, the mode controller 512 supplies a signal corresponding to the first mode to the oscillator controller 513. The oscillator controller 513 may control the oscillator 514 to generate the first clock signal CLK1 regardless of the driving frequency signal DF when the signal corresponding to the first mode is input. That is, when the mode control signal MCS corresponding to the first mode is input, the oscillator 514 generates the first clock signal CLK1. In this case, the display device 10 may be driven at a frequency equal to or less than a first driving frequency in the first mode.

Referring to a case of driving in the second mode with reference to FIG. 11, the mode control signal MCS corresponding to the second mode is supplied to the mode controller 512. When the mode control signal MCS corresponding to the second mode is supplied, the mode controller 512 supplies a signal corresponding to the second mode to the oscillator controller 513. The oscillator controller 513 controls the oscillator 514 in response to the driving frequency signal DF when the signal corresponding to the second mode is input.

For example, the driving frequency signal DF corresponding to the second frame frequency may be input to the oscillator controller 513. In this case, the oscillator controller 513 controls the oscillator 514 to generate the second clock signal CLK2, and thus, the display device 10 may be driven at the second frame frequency.

The driving frequency signal DF corresponding to the frequency equal to or less than the first frame frequency may be input to the oscillator controller 513 while driven in the second mode. In this case, the oscillator controller 513 controls the oscillator 514 to generate the first clock signal CLK1. At this time, the timing controller 500 may drive the display device 10 at the frequency equal to or less than the first frame frequency using the first clock signal CLK1 (that is, driven in the first mode).

That is, in an embodiment of the disclosure, when the mode control signal MCS is set to the second mode, the oscillator 514 may generate the second clock signal CLK2 in response to a frequency exceeding the first frame frequency. In addition, in an embodiment of the disclosure, even though the mode control signal MCS is set to the second mode, the oscillator 514 may generate the first clock signal CLK1 in response to the frequency equal to or less than the first frame frequency. That is, in an embodiment of the disclosure, even though the mode control signal MCS corresponding to the second mode is input, when the display device 10 is driven at the frequency equal to or less than the first frame frequency, the display device 10 may be driven in the first mode.

The start signal controller 516 may generate the emission start signal under the control of the oscillator controller 513 (or the mode controller 512). The emission start signal may be included in the emission unit control signal ECS and supplied to the emission driver 300. The start signal controller 516 may generate the emission start signal so that the number of off periods of the emission control signal is adjusted in response to the frame frequency.

For example, the start signal controller 516 may generate the emission start signal so that the off period of the emission control signal is the same during one frame of the first frame frequency and one frame of the second frame frequency as shown in FIGS. 11, 12A, and 12B. For example, the start signal controller 516 may generate the emission start signal so that one frame of the first frame frequency includes a four off period of emission control signals (for example, 4 cycles). In addition, the start signal controller 516 may generate the emission start signal so that one frame of the second frame frequency includes a four off period of emission control signals (for example, 4 cycles).

When the number of off periods of the emission control signal included in one frame period of the first frame frequency of the first mode is equal to the number of off periods of the emission control signal included in one frame period of the second frame frequency of the second mode as described above, even though the mode is changed from the second mode to the first mode, the luminance difference may be minimized or reduced.

In an embodiment, ratios occupied by the off period of the emission control signal during one frame period of each of the first frame frequency of the first mode and the second frame frequency of the second mode may be set to be the same. For example, as shown in FIG. 12A, a ratio occupied by one off period of the emission control signal may be set to about 4% when driven at the second driving frequency. In this case, the ratio of the off period in one frame is set to about 16%. In addition, a ratio occupied by one off period of the emission control signal may be set to about 4% when driven at the first driving frequency. In this case, the ratio of the off period in one frame is set to about 16%. As described above, when the ratios occupied by the off period of the emission control signal in one frame period of each of the first frame frequency of the first mode and the second frame frequency of the second mode is set to be the same, even though a driving frequency is changed from the second frequency of the second mode to the first frame frequency of the first mode, the luminance difference may be minimized or reduced.

Additionally, in an embodiment of the disclosure, the ratio occupied by the off period of the emission control signal may be variously set. For example, as shown in FIG. 12B, the ratio of one off period of the emission control signal may be set to about 2%, and in this case, the ratio of the off period of the emission control signal in one frame may be set to about 8%. In an embodiment of the disclosure, the ratio occupied by one off period of the emission control signal may be experimentally set variously in consideration of, for example, a size, a resolution, and the like of a display panel.

Figure 13A:
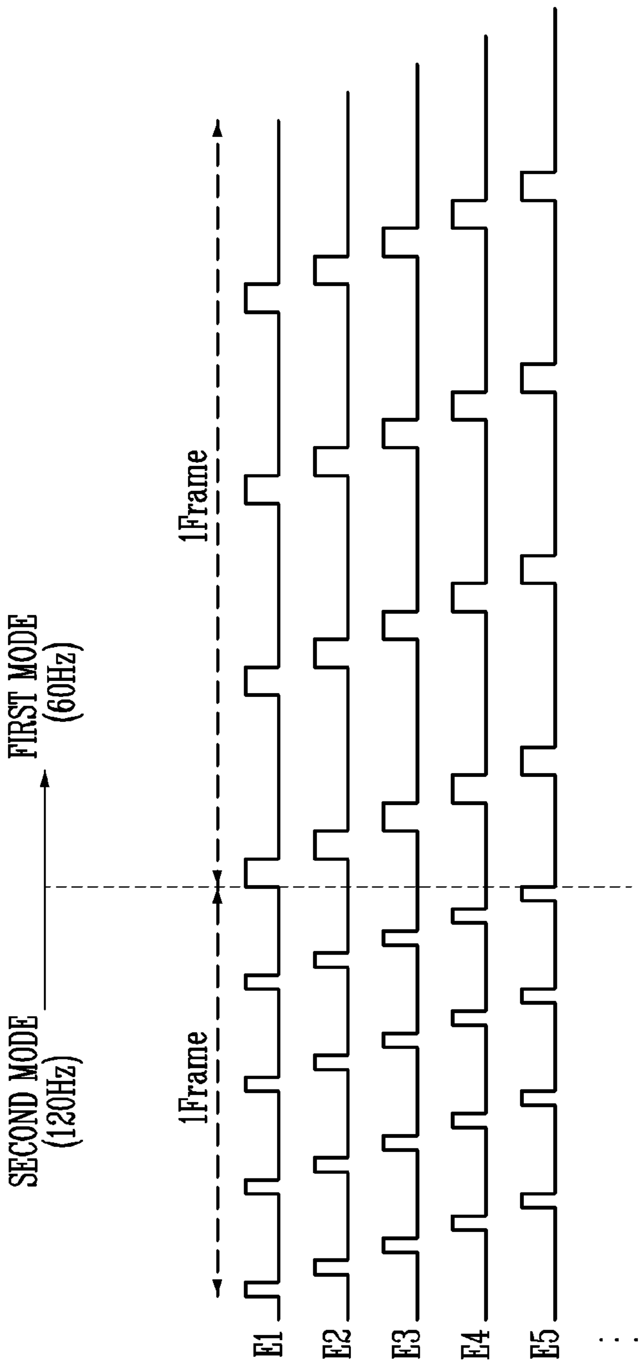
FIGS. 13A and 13B are diagrams illustrating a luminance difference when changing from the second frame frequency of the second mode to the first frame frequency of the first mode using the timing controller of FIG. 10 according to an embodiment of the disclosure.
Figure 13B:
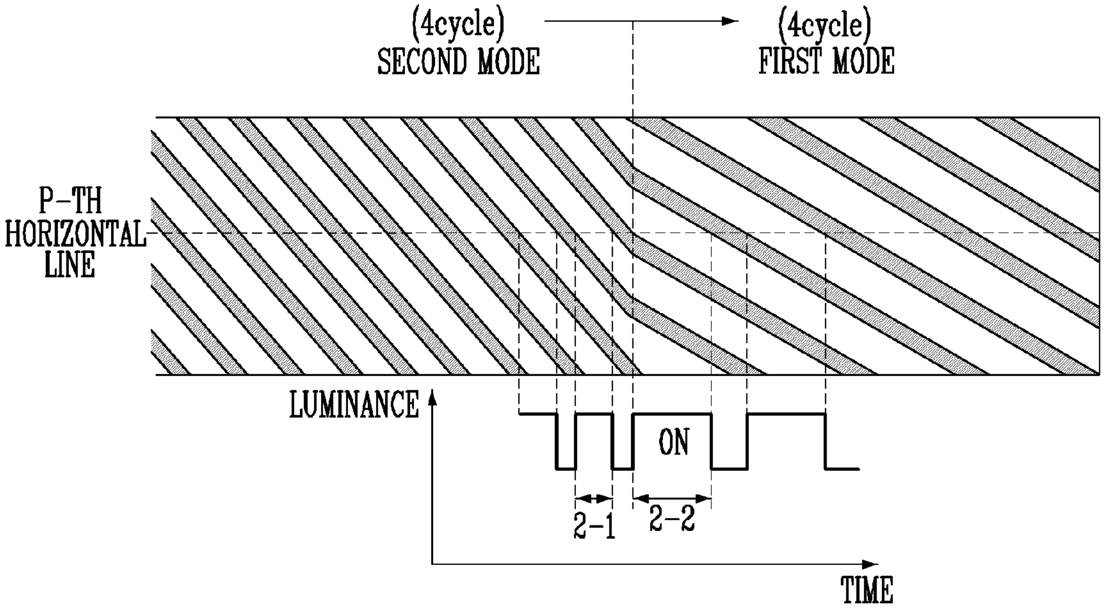

FIGS. 13A and 13B are diagrams illustrating a luminance difference when changing from the second frame frequency of the second mode to the first frame frequency of the first mode using the timing controller of FIG. 10 according to an embodiment of the disclosure. In FIGS. 13A and 13B, it is assumed that the second frame frequency is about 120 Hz and the first frame frequency is about 60 Hz. In FIG. 13A, for convenience of description, the emission control signal supplied to five emission control lines E1 to E5 is illustrated.

Referring to FIG. 13A, the emission control signal includes four off periods (that is, non-emission periods) at the second frame frequency of the second mode, and the emission control signal includes four off periods at the first frame frequency of the first mode. That is, each frame of the second frame frequency of the second mode and the first frame frequency of the first mode may include the same number (number of times) of off periods of the emission control signal.

When the emission control signal including four off periods is supplied during one frame period at the second frame frequency of the second mode, a time difference between a last off period of the emission control signal supplied at the second frame frequency of the second mode and a first off period of the emission control signal at the first frame frequency of the first mode may be reduced, and thus, a luminance difference may be minimized or reduced.

For example, as shown in FIG. 13B, when a pixel positioned on a p-th horizontal line corresponding to an approximate middle area of the pixel unit 100 is changed from the second mode to the first mode, a portion of the emission time may be increased in a (2-2)-th period compared to a previous period (for example, a (2-1)-th period), but an increase time thereof may be reduced compared to the comparative example. For example, the (2-2)-th period may be set to about 4 ms, and the (2-1)-th period may be set to about 1.75 ms. In this case, the (2-2)-th period and the (2-1)-th period have an emission time difference of about 2.25 ms. In the comparative example of FIG. 9B, the (1-1)-th period and the (1-2)-th period have an emission time difference of about 4.5 ms. That is, in an embodiment of the disclosure, the emission time difference may be minimized or reduced compared to the comparative example, and thus, when the mode is changed from the second mode to the first mode, the luminance difference may be prevented from being perceived by the user.

In the above description, the display device 10 is driven in the second mode when driven in the second driving frequency, and is driven in the first mode when driven at a frequency equal to or less than the first driving frequency. However, the disclosure is not limited thereto. For example, as shown in FIG. 14, in an embodiment, the display device 10 may be driven at the first driving frequency in the second mode or may be driven at the first driving frequency in the first mode. In this case, the mode controller 512 (or the oscillator controller 513) may determine driving of the first mode or the second mode in response to various driving conditions.

Figure 15:
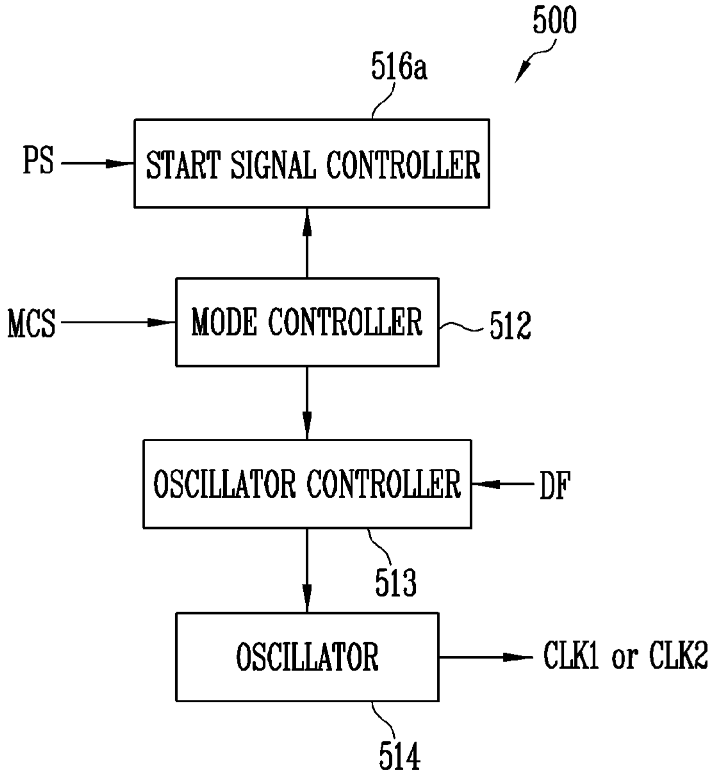
FIG. 15 illustrates a timing controller according to an embodiment of the disclosure.

FIG. 15 illustrates a timing controller according to an embodiment of the disclosure. When describing FIG. 15, for convenience of explanation, a further description of components and technical aspects previously described with reference to FIG. 10 may be omitted.

Referring to FIG. 15, a timing controller 500 according to an embodiment of the disclosure may include the mode controller 512, the oscillator controller 513, the oscillator 514, and a start signal controller 516*a*.

The start signal controller 516*a* may generate the emission start signal under the control of the oscillator controller 513 (or the mode controller 512). The start signal controller 516*a* may generate the emission start signal so that the number of off periods of the emission control signal included in the first driving frequency of the first mode is equal to the number of off periods of the emission control signal included in the second driving frequency of the second mode. For example, the start signal controller 516*a* may generate the emission start signal so that an off period of four emission control signals is included when driving at the first driving frequency of the first mode, and generate the emission start signal so that an off period of four emission control signals is included when driving at the second driving frequency of the second mode.

Additionally, the start signal controller 516*a* may receive a photo sensing signal PS. The photo sensing signal PS may be supplied to the start signal controller 516*a* when the display device 10 senses illuminance. The start signal controller 516*a* that receives the photo sensing signal PS may change the number of off periods of the emission control signal included in one frame period of the second driving frequency during a time when the illuminance is sensed. For example, when the photo sensing signal PS is supplied, the start signal controller 516*a* may generate the emission start signal so that less off periods are included in the emission control signals. For example, when the photo sensing signal PS is supplied, the start signal controller 516*a* may generate the emission start signal so that an off period of two emission control signals is included during one frame period of the second driving frequency.

Figure 16:
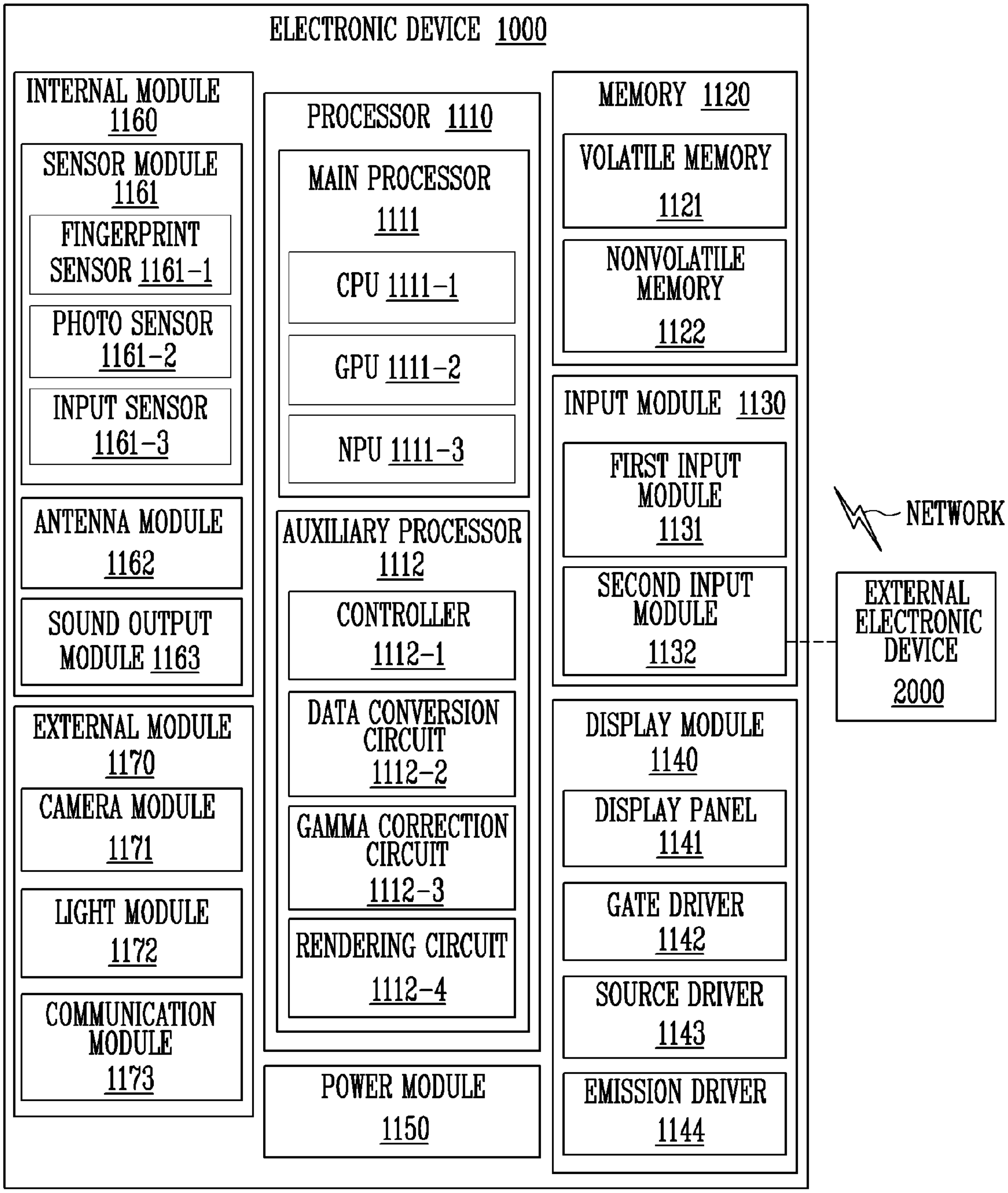
FIG. 16 is a diagram illustrating an electronic device according to an embodiment of the disclosure.

FIG. 16 is a diagram illustrating an electronic device according to an embodiment of the disclosure.

Referring to FIG. 16, the electronic device according to an embodiment of the disclosure outputs various pieces of information through a display module 1140. The display module 1140 may correspond to at least a portion of the display device 10 of FIG. 1. When a processor 1110 executes an application stored in a memory 1120, the display module 1140 provides application information to a user through a display panel 1141. The display panel 1141 may have a configuration corresponding to the pixel unit 100 of FIG. 1.

The processor 1110 obtains an external input through an input module 1130 or a sensor module 1161 and executes an application corresponding to the external input. For example, when the user selects a camera icon displayed on the display panel 1141, the processor 1110 obtains a user input through an input sensor 1161-3 and activates a camera module 1171. The processor 1110 transmits image data corresponding to a captured image obtained through the camera module 1171 to the display module 1140. The display module 1140 may display an image corresponding to the captured image through the display panel 1141.

As another example, when personal information authentication is executed in the display module 1140, a fingerprint sensor 1161-1 obtains input fingerprint information as input data. The processor 1110 compares input data obtained through the fingerprint sensor 1161-1 with authentication data stored in a memory 1120 and executes an application according to a comparison result. The display module 1140 may display information executed according to a logic of the application through the display panel 1141.

As still another example, when a music streaming icon displayed on the display module 1140 is selected, the processor 1110 obtains a user input through the input sensor 1161-3 and activates a music streaming application stored in the memory 1120. When a music execution command is input in the music streaming application, the processor 1110 activates a sound output module 1163 to provide sound information corresponding to the music execution command to the user.

In the above, an operation of the electronic device 1000 is briefly described. Hereinafter, a configuration of the electronic device 1000 is described in detail. Some configurations of the electronic device 1000 to be described later may be integrated and provided as one configuration, and one configuration may be separated into two or more configurations and provided.

The electronic device 1000 may communicate with an external electronic device 2000 through a network (for example, a short-range wireless communication network or a long-range wireless communication network). According to an embodiment, the electronic device 1000 may include the processor 1110, a memory 1120, an input module 1130, the display module 1140, a power module 1150, an internal module 1160, and an external module 1170. According to an embodiment, in the electronic device 1000, at least one of the above-described components may be omitted or one or more other components may be added. According to an embodiment, some of the above-described components (for example, the sensor module 1161, an antenna module 1162, or the sound output module 1163) may be integrated into another component (for example, the display module 1140).

The processor 1110 may execute software to control at least another component (for example, a hardware or software component) of the electronic device 1000 connected to the processor 1110, and perform various data processing or operations. According to an embodiment, as at least a portion of the data processing or operation, the processor 1110 may store a command or data received from another component (for example, the input module 1130, the sensor module 1161, or a communication module 1173) in a volatile memory 1121 and process the command or the data stored in the volatile memory 1121, and result data may be stored in a nonvolatile memory 1122.

The processor 1110 may include a main processor 1111 and an auxiliary processor 1112. The auxiliary processor 1112 may correspond to at least a partial configuration of the timing controller 500 of FIG. 1.

The main processor 1111 may include one or more of a central processing unit (CPU) 1111-1 or an application processor (AP). The main processor 1111 may further include any one or more of a graphic processing unit (GPU) 1111-2, a communication processor (CP), and an image signal processor (ISP). The main processor 1111 may further include a neural processing unit (NPU) 1111-3. The NPU is a processor specialized in processing an artificial intelligence model, and the artificial intelligence model may be generated through machine learning. The artificial intelligence model may include a plurality of artificial neural network layers. The artificial neural network may be one of, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the above, but is not limited thereto. Additionally or alternatively, the artificial intelligence model may include a software structure in addition to a hardware structure. At least two of the above-described processing units and processors may be implemented as one integrated configuration (for example, a single chip), or each may be implemented as an independent configuration (for example, a plurality of chips).

The auxiliary processor 1112 may include a controller 1112-1. The controller 1112-1 may include an interface conversion circuit and a timing control circuit. The controller 1112-1 receives an image signal from the main processor 1111, converts a data format of the image signal to correspond to an interface specification with the display module 1140, and outputs image data.

The controller 1112-1 may output various control signals utilized to drive the display module 1140. For example, the controller 1112-1 may include the mode controller 512, the oscillator controller 513, the oscillator 514, and the start signal controller 516 shown in FIG. 10. The controller 1112-1 may generate the first control signal CS1 using the first clock signal CLK1 when the controller 1112-1 is driven in the first mode. In addition, the controller 1112-1 may generate the second control signal CS2 using the second clock signal CLK2 when the controller 1112-1 is driven at the second frame frequency in the second mode, and generate the first control signal CS1 using the first clock signal CLK1 when the controller 1112-1 is driven at the first frame frequency in the second mode.

The auxiliary processor 1112 may further include a data conversion circuit 1112-2, a gamma correction circuit 1112-3, a rendering circuit 1112-4, and the like. The data conversion circuit 1112-2 may receive the image data from the controller 1112-1, compensate the image data to display an image with a desired luminance according to, for example, a characteristic of the electronic device 1000, a setting of the user, or the like, or convert the image data for, for example, reduction of power consumption, afterimage compensation, or the like.

The gamma correction circuit 1112-3 may convert, for example, the image data, a gamma reference voltage, or the like so that the image displayed on the electronic device 1000 has a desired gamma characteristic. The rendering circuit 1112-4 may receive the image data from the controller 1112-1 and render the image data in consideration of a pixel disposition or the like of the display panel 1141 applied to the electronic device 1000. At least one of the data conversion circuit 1112-2, the gamma correction circuit 1112-3, and the rendering circuit 1112-4 may be integrated into another component (for example, the main processor 1111 or the controller 1112-1). At least one of the data conversion circuit 1112-2, the gamma correction circuit 1112-3, and the rendering circuit 1112-4 may be integrated into a source driver 1143 to be described further below.

The memory 1120 may store various data used by at least one component (for example, the processor 1110 or the sensor module 1161) of the electronic device 1000, and input data or output data for a command related thereto. The memory 1120 may include at least one of the volatile memory 1121 and the nonvolatile memory 1122.

The input module 1130 may receive a command or data to be used by a component (for example, the processor 1110, the sensor module 1161, or the sound output module 1163) of the electronic device 1000 from outside of the electronic device 1000 (for example, from the user or the external electronic device 2000).

The input module 1130 may include a first input module 1131 to which a command or data is input from the user and a second input module 1132 to which a command or data is input from the external electronic device 2000. The first input module 1131 may include, for example, a microphone, a mouse, a keyboard, a key (for example, a button), or a pen (for example, a passive pen or an active pen). The second input module 1132 may support a designated protocol capable of connecting to the external electronic device 2000 by wire or wirelessly. According to an embodiment, the second input module 1132 may include, for example, a high definition multimedia interface (HDMI), a universal serial bus (USB) interface, an SD card interface, or an audio interface. The second input module 1132 may include a connector capable of physically connecting to the external electronic device 2000, for example, an HDMI connector, a USB connector, an SD card connector, or an audio connector (for example, a headphone connector).

The display module 1140 visually provides information to the user. The display module 1140 may include the display panel 1141, a gate driver 1142, a source driver 1143, and an emission driver 1144. The gate driver 1142 may correspond to at least a portion of the scan driver 200 shown in FIG. 1. The source driver 1143 may correspond to at least a portion of the data driver 400 shown in FIG. 1. The emission driver 1144 may correspond to at least a portion of the emission driver 300 shown in FIG. 1. The display module 1140 may further include, for example, a window, a chassis, and a bracket that protect the display panel 1141.

The display panel 1141 (or a display) may include, for example, a liquid crystal display panel, an organic light emitting display panel, or an inorganic light emitting display panel. However, the type of the display panel 1141 is not particularly limited. The display panel 1141 may be a rigid type or a flexible type that may be rolled, bent or folded. The display module 1140 may further include, for example, a supporter, a bracket, a heat dissipation member, or the like that supports the display panel 1141.

The gate driver 1142 may be mounted on the display panel 1141 as a driving chip. In addition, the gate driver 1142 may be integrated in the display panel 1141. For example, the gate driver 1142 may include an amorphous silicon TFT gate driver circuit (ASG), a low temperature polycrystalline silicon (LTPS) TFT gate driver circuit, or an oxide semiconductor TFT gate driver circuit (OSG) built into the display panel 1141. The gate driver 1142 receives the first control signal CS1 or the second control signal CS2 from the controller 1112-1 and outputs the scan signals to the display panel 1141 in response to the first control signal CS1 or the second control signal CS2.

The emission driver 1144 may be mounted on the display panel 1141 as a driving chip. In addition, the emission driver 1144 may be integrated into the display panel 1141 similarly to the gate driver 1142. The emission driver 1144 outputs the emission control signal to the display panel 1141 in response to the first control signal CS1 and the second control signal CS2 received from the controller 1112-1. The emission driver 1144 may be formed separately from the gate driver 1142 or integrated into the gate driver 1142. Additionally, the emission driver 1144 may generate the emission control signal in response to the emission start signal supplied from the start signal controller 516.

The source driver 1143 receives the first control signal CS1 or the second control signal CS2 from the controller 1112-1, converts image data into an analog voltage (for example, a data signal) in response to the first control signal CS1 or the second control signal CS2, and then outputs the data signals to the display panel 1141.

The source driver 1143 may be integrated into another component (for example, the controller 1112-1). A function of the interface conversion circuit and the timing control circuit of the controller 1112-1 described above may be integrated into the source driver 1143.

The display module 1140 may further include a voltage generation circuit. The voltage generation circuit may output various voltages utilized to drive the display panel 1141. In an embodiment, the display panel 1141 may include a plurality of pixel columns each including a plurality of pixels.

In an embodiment, the source driver 1143 may convert data corresponding to red (R), green (G), and blue (B) (for example, the output data Dout) into a red data signal (or data voltage), a green data signal, and the blue data signal, and may provide the red data signal, the green data signal, and the blue data signal to the plurality of pixel columns included in the display panel 1141 during one horizontal period.

The power module 1150 supplies power to a component of the electronic device 1000. The power module 1150 may include a battery that charges a power voltage. The battery may include a non-rechargeable primary cell, and a rechargeable secondary cell or fuel cell. The power module 1150 may include a power management integrated circuit (PMIC). The PMIC supplies optimized power to each of the above-described modules, as well as to modules to be described below. The power module 1150 may include a wireless power transmission/reception member electrically connected to the battery. The wireless power transmission/reception member may include a plurality of antenna radiators of a coil form.

The electronic device 1000 may further include the internal module 1160 and the external module 1170. The internal module 1160 may include the sensor module 1161, the antenna module 1162, and the sound output module 1163. The external module 1170 may include the camera module 1171, a light module 1172, and the communication module 1173.

The sensor module 1161 may sense an input by a body part of the user (e.g., the user's finger) or an input by a pen among the first input module 1131, and may generate an electrical signal or a data value corresponding to the input. In addition, the sensor module 1161 may sense an external environment (for example, illuminance, temperature, and the like) and generate an electrical signal or a data value corresponding to the external environment.

The sensor module 1161 may include at least one of the fingerprint sensor 1161-1, a photo sensor 1161-2, and the input sensor 1161-3. The fingerprint sensor 1161-1 may generate a data value corresponding to a fingerprint of the user. The fingerprint sensor 1161-1 may include any one of an optical type fingerprint sensor or a capacitive type fingerprint sensor.

The photo sensor—1161-2 (or an illuminance sensor) may sense external illuminance and provide an electrical signal or a data value corresponding to the sensed illuminance to the auxiliary processor 1112 (or the processor 1110). Additionally, the photo sensor 1161-2 may provide the photo sensing signal PS to the controller 1112-1 at a time point when the illuminance is sensed. The controller 1112-1 that receives the photo sensing signal PS may control the number of off periods included in the emission start signal. For example, when the photo sensing signal PS is supplied, the controller 1112-1 may control the emission start signal so that an off period of a less number of emission control signals is included in one frame period of the second driving frequency.

The input sensor 1161-3 may generate a data value corresponding to coordinate information of the input by the body part of the user or the pen. The input sensor 1161-3 generates a capacitance change amount by the input as the data value. The input sensor 1161-3 may sense an input by the passive pen or may transmit/receive data to and from the active pen.

The input sensor 1161-3 may measure a biometric signal such as, for example, blood pressure, water, or body fat. For example, when the user touches a sensor layer or a sensing panel with a body part and does not move during a certain time, the input sensor 1161-3 may sense the biometric signal based on a change of an electric field by the body part and output information desired by the user to the display module 1140.

The sensor module 1161 may further include a digitizer. The digitizer may generate a data value corresponding to coordinate information input by a pen. The digitizer generates an electromagnetic change amount by an input as the data value. The digitizer may sense an input by a passive pen or transmit or receive data to or from the active pen.

At least one of the fingerprint sensor 1161-1, the photo sensor 1161-2, and the input sensor 1161-3 may be implemented as a sensor layer formed on the display panel 1141 through a successive process.

At least two of the fingerprint sensor 1161-1, the photo sensor 1161-2, and the input sensor 1161-3 may be formed to be integrated into one sensing panel through the same process. When at least two of the fingerprint sensor 1161-1, the photo sensor 1161-2, and the input sensor 1161-3 are integrated into one sensing panel, the sensing panel may be disposed between the display panel 1141 and a window disposed above the display panel 1141. According to an embodiment, the sensing panel may be disposed on the window. However, the position of the sensing panel is not particularly limited.

At least one of the fingerprint sensor 1161-1, the photo sensor 1161-2, and the input sensor 1161-3 may be embedded in the display panel 1141. That is, at least one of the fingerprint sensor 1161-1, the photo sensor 1161-2, and the input sensor 1161-3 may be simultaneously formed through a process of forming elements (for example, a light emitting element, a transistor, and the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, or a humidity sensor.

The antenna module 1162 may include one or more antennas that transmit a signal or power to the outside of the electronic device 1000 or that receive a signal or power from outside of the electronic device 1000. According to an embodiment, the communication module 1173 may transmit a signal to the external electronic device 2000 or receive a signal from the external electronic device 2000 through an antenna suitable for a communication method. An antenna pattern of the antenna module 1162 may be integrated into one configuration (for example, the display panel 1141) of the display module 1140 or the input sensor 1161-3.

The sound output module 1163 is a device that outputs a sound signal to the outside of the electronic device 1000, and may include, for example, a speaker used for general purposes such as multimedia playback or recording playback, and a receiver used exclusively for receiving a call. According to an embodiment, the receiver may be formed integrally with or separately from the speaker. A sound output pattern of the sound output module 1163 may be integrated into the display module 1140.

The camera module 1171 may capture a still image and a moving image. According to an embodiment, the camera module 1171 may include one or more lenses, an image sensor, or an image signal processor. The camera module 1171 may further include an infrared camera capable of measuring, for example, presence or absence of the user, a position of the user, a gaze of the user, and the like.

The light module 1172 may provide light. The light module 1172 may include, for example, a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000 and communication performance through the established communication channel. The communication module 1173 may include any one or both of a wireless communication module such as, for example, a cellular communication module, a short-range wireless communication module, or a global navigation satellite system (GNSS) communication module, and a wired communication module such as, for example, a local area network (LAN) communication module or a power line communication module. The communication module 1173 may communicate with the external electronic device 2000 through a short-range communication network such as, for example, BLUETOOTH, WIFI Direct, or infrared data association (IrDA), or a long-range communication network such as, for example, a cellular network, the Internet, or a computer network (for example, LAN or WAN). The above-described various types of communication modules 1173 may be implemented as a single chip or as separate chips.

The input module 1130, the sensor module 1161, the camera module 1171, and the like may be used to control an operation of the display module 1140 in conjunction with the processor 1110.

The processor 1110 outputs a command or data to the display module 1140, the sound output module 1163, the camera module 1171, or the light module 1172 based on input data received from the input module 1130. For example, the processor 1110 may generate image data in response to the input data applied through, for example, a mouse, an active pen, or the like and output the image data to the display module 1140, or generate command data in response to the input data and output the command data to the camera module 1171 or the light module 1172. When the input data is not received from the input module 1130 during a certain time, the processor 1110 may convert an operation mode of the electronic device 1000 to a low power mode or a sleep mode to reduce power consumed by the electronic device 1000.

The processor 1110 outputs a command or data to the display module 1140, the sound output module 1163, the camera module 1171, or the light module 1172 based on sensing data received from the sensor module 1161. For example, the processor 1110 may compare authentication data applied by the fingerprint sensor 1161-1 with authentication data stored in the memory 1120 and then execute an application according to a comparison result. The processor 1110 may execute the command based on sensing data sensed by the input sensor 1161-3 or output corresponding image data to the display module 1140. The processor 1110 may control a luminance of the display panel 1141 in response to the illuminance sensed by the photo sensor 1161-2. When the sensor module 1161 includes a temperature sensor, the processor 1110 may receive temperature data for a measured temperature from the sensor module 1161 and further perform luminance correction or the like on the image data based on the temperature data.

The processor 1110 may receive measurement data for, for example, the presence of the user, the position of the user, the gaze of the user, and the like, from the camera module 1171. The processor 1110 may further perform luminance correction or the like on the image data based on the measurement data. For example, the processor 1110 that determines the presence or absence of the user through an input from the camera module 1171 may output image data of which a luminance is corrected through the data conversion circuit 1112-2 or the gamma correction circuit 1112-3 to the display module 1140.

Some of the above-described components may be connected to each other through a communication method between peripheral devices such as, for example, a bus, general purpose input/output (GPIO), a serial peripheral interface (SPI), a mobile industry processor interface (MIPI), or an ultra path interconnect (UPI) link to exchange a signal (for example, a command or data) with each other. The processor 1110 may communicate with the display module 1140 through a mutually agreed interface, for example, may use any one of the above-described communication methods, and is not limited to the above-described communication methods.

The electronic device 1000 according to various embodiments disclosed in this document may be various types of devices. The electronic device 1000 may include, for example, at least one of a portable communication device (for example, a smartphone), a computer device, a portable multimedia device, a portable medical device, a camera, a wearable device, or a home appliance. However, the electronic device 1000 is not limited to the above-described devices.

As is traditional in the field of the inventive concept, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the disclosure has been particularly shown and described with reference to embodiments thereof, it will be understood by those of ordinary skill in the art that various changes in form and detail may be made therein without departing from the spirit and scope of the disclosure as defined by the following claims.

What is claimed is:

1. A display device comprising:

a timing controller configured to generate a first control signal using a first clock signal when driven at a first frame frequency, and generate a second control signal using a second clock signal when driven at a second frame frequency different from the first frame frequency;

a plurality of pixels, each connected to at least one of a plurality of scan lines, a data line among a plurality of data lines, and an emission control line among a plurality of emission control lines; and an emission driver configured to supply an emission control signal to the emission control lines in response to an emission start signal included in the first control signal or the second control signal, wherein a number of off periods of the emission control signal included in one frame driven at the first frame frequency is equal to a number of off periods of the emission control signal included in one frame driven at the second frame frequency.

2. The display device according to claim 1, wherein the second frame frequency is higher than the first frame frequency.

3. The display device according to claim 2, wherein a frequency of the second clock signal is higher than a frequency of the first clock signal.

4. The display device according to claim 2, further comprising:

a scan driver configured to supply a scan signal to the scan lines in response to the first control signal or the second control signal; and a data driver configured to supply a data signal to the data lines in response to the first control signal or the second control signal.

5. The display device according to claim 2, wherein the timing controller generates the second control signal using the second clock signal when driven at a frequency exceeding the first frame frequency, and generates the first control signal using the first clock signal when driven at a frequency equal to or less than the first frame frequency.

6. The display device according to claim 5, wherein a width of a first active period included in the one frame driven at the first frame frequency is different from a width of a second active period included in the one frame driven at the second frame frequency.

7. The display device according to claim 6, wherein the width of the first active period is wider than the width of the second active period.

8. The display device according to claim 1, wherein a ratio occupied by an off period of the emission control signal in the one frame driven at the first frame frequency is equal to a ratio occupied by an off period of the emission control signal in the one frame driven at the second frame frequency.

9. The display device according to claim 1, wherein the timing controller receives a mode control signal including a first mode corresponding to driving at a frequency equal to or less than the first frame frequency or a second mode corresponding to driving at a frequency equal to or less than the second frame frequency.

10. The display device according to claim 9, wherein the timing controller comprises:

an oscillator configured to output the first clock signal or the second clock signal;

a mode controller configured to receive the mode control signal;

an oscillator controller configured to control the oscillator in response to a driving frequency signal, and the first mode or the second mode included in the mode control signal; and a start signal controller configured to output the emission start signal.

11. The display device according to claim 10, wherein the oscillator generates the first clock signal under control of the oscillator controller when driven in the first mode.

12. The display device according to claim 10, wherein when the oscillator controller is driven in the second mode, the oscillator generates the first clock signal under control of the oscillator controller when driving frequency information included in the driving frequency signal is equal to or less than the first frame frequency, and the oscillator generates the second clock signal under the control of the oscillator controller when the driving frequency information included in the driving frequency signal exceeds the first frame frequency and is equal to or less than the second frame frequency.

13. The display device according to claim 10, wherein the start signal controller controls the emission start signal such that the number of off periods of the emission control signal included in the one frame driven at the second frame frequency is changed when a photo sensing signal corresponding to illuminance sensing is supplied.

14. The display device according to claim 13, wherein the start signal controller changes the emission start signal such that a less number of emission off periods are included in the one frame driven at the second frame frequency when the photo sensing signal is supplied.

15. A display device driven in a first mode in which a highest frequency is a first frame frequency and in a second mode in which a highest frequency is a second frame frequency higher than the first frame frequency, the display device comprising:

a timing controller configured to generate a first control signal using a first clock signal such that one frame includes a first active period when driven at the first frame frequency in the second mode, and generate a second control signal using a second clock signal such that one frame includes a second active period different from the first active period when changed from the first frame frequency to the second frame frequency;

a plurality of pixels connected to at least one of a plurality of scan lines, a data line among a plurality of data lines, and an emission control line among a plurality of emission control lines;

a scan driver configured to supply a scan signal to the scan lines in response to the first control signal or the second control signal; and an emission driver configured to supply an emission control signal to the emission control lines in response to the first control signal or the second control signal.

16. The display device according to claim 15, wherein the second frame frequency is higher than the first frame frequency.

17. The display device according to claim 16, wherein a frequency of the second clock signal is higher than a frequency of the first clock signal.

18. The display device according to claim 16, wherein the emission control signal includes at least two or more off periods such that the pixels do not emit light during one frame period, and a number of off periods included in one frame period when driven at the first frame frequency is equal to a number of off periods included in one frame period when driven at the second frame frequency.

19. A method of driving a display device driven in a first mode in which a first frame frequency is set to a highest frequency and a second mode in which a second frame frequency is set to a highest frequency, the method comprising:

generating a second control signal using a second clock signal when a mode control signal corresponding to the second mode is input;

driving the display device at the second frame frequency using the second control signal;

changing a driving frequency of the display device to the first frame frequency while driven in the second mode;

generating a first control signal using a first clock signal different from the second clock signal; and driving the display device at the first frame frequency using the first control signal.

20. The method according to claim 19, wherein the second frame frequency is higher than the first frame frequency.

21. The method according to claim 20, wherein a frequency of the second clock signal is higher than a frequency of the first clock signal.

22. The method according to claim 20, further comprising:

generating the first control signal using the first clock signal when the mode control signal corresponding to the first mode is input; and driving the display device at the first frame frequency using the first control signal.

23. The method according to claim 20, wherein a number of times pixels do not emit light during one frame period when driven at the first frame frequency is equal to a number of times that the pixels do not emit light during one frame period when driven at the second frame frequency.

24. The method according to claim 20, wherein a width of a first active period included in one frame when driven at the first frame frequency is different from a width of a second active period included in one frame when driven at the second frame frequency.

25. The method according to claim 24, wherein the width of the first active period is wider than the width of the second active period.

26. An electronic device, comprising:

a controller configured to generate a first control signal using a first clock signal regardless of a frame frequency change when driven in a first mode in which a highest frequency is a first frame frequency, and generate the first control signal or a second control signal using the first clock signal or a second clock signal in response to the frame frequency change when driven in a second mode in which a highest frequency is a second frame frequency higher than the first frame frequency;

a display panel controlled by the first control signal or the second control signal and configured to display an image; and an emission driver configured to control an emission time of pixels included in the display panel by supplying an emission control signal in response to an emission start signal supplied from the controller.

27. The electronic device according to claim 26, wherein the controller generates the first control signal using the first clock signal when driven at a frequency equal to or less than the first frame frequency in the second mode, and generates the second control signal using the second clock signal when driven at a frequency exceeding the first frame frequency.

28. The electronic device according to claim 26, wherein a number of off periods of the emission control signal included in one frame period when driven at the first frame frequency is equal to a number of off periods included in one frame period when driven at the second frame frequency.

29. The electronic device according to claim 26, further comprising:

a photo sensor configured to sense external illuminance.

30. The electronic device according to claim 29, wherein the photo sensor supplies a photo sensing signal to the controller when sensing the external illuminance, and the controller changes a number of off periods of the emission control signal included in one frame of the second frame frequency when the photo sensing signal is supplied.

31. The electronic device according to claim 30, wherein the controller controls the emission start signal such that a less number of emission off periods are included in one frame of the second frame frequency when the photo sensing signal is supplied.

* * * * *